US009787400B2

(12) United States Patent
Bourg et al.

(10) Patent No.: US 9,787,400 B2
(45) Date of Patent: Oct. 10, 2017

(54) FIBER-WIRELESS SYSTEM AND METHODS FOR SIMPLIFIED AND FLEXIBLE FTTX DEPLOYMENT AND INSTALLATION

(71) Applicant: Corning Optical Communications LLC, Hickory, NC (US)

(72) Inventors: Kevin Lee Bourg, Alphretta, GA (US); Anthony Ng'oma, Horseheads, NY (US); Roni Aharon Shurki, Modiin (IL); Hejie Yang, Painted Post, NY (US)

(73) Assignee: Corning Optical Communications LLC, Hickory, NC (US)

( * ) Notice: Subject to any disclaimer, the term of this patent is extended or adjusted under 35 U.S.C. 154(b) by 0 days.

(21) Appl. No.: 15/090,709

(22) Filed: Apr. 5, 2016

(65) Prior Publication Data

US 2016/0301474 A1    Oct. 13, 2016

Related U.S. Application Data

(60) Provisional application No. 62/144,614, filed on Apr. 8, 2015.

(51) Int. Cl.
*H04B 10/00* (2013.01)
*H04B 10/27* (2013.01)
(Continued)

(52) U.S. Cl.
CPC .............. *H04B 10/27* (2013.01); *H04J 14/02* (2013.01); *H04L 12/6418* (2013.01); *H04Q 11/0001* (2013.01); *H04L 49/351* (2013.01)

(58) Field of Classification Search
USPC .................................................. 398/115–117
See application file for complete search history.

(56) References Cited

U.S. PATENT DOCUMENTS 4,941,207 A * 7/1990 Maeda ...................... H04B 7/24
                                                                174/384
5,835,128 A * 11/1998 Macdonald .............. H04N 7/20
                                                                348/E7.093
(Continued)

FOREIGN PATENT DOCUMENTS

AU        2003203591 A1    3/2004
CN        101095971 A      1/2008
(Continued)

OTHER PUBLICATIONS

Cartaxo, A.; Morgado, J.A.P.; Fonseca, D., "A Perspective on Optical-Wireless Converged NG-FTTH Networks Using Directly Modulated Lasers," Transparent Optical Networks (ICTON), 2011 13th International Conference on, pp. 1-4, Jun. 26-30, 2011.
(Continued)

*Primary Examiner* — Agustin Bello
(74) *Attorney, Agent, or Firm* — William D. Doyle

(57) ABSTRACT

A method and system implementations thereof include receiving data from a passive optical network (PON) outside a building; wirelessly transmitting the received PON data to inside the building; and applying the received PON data to a network inside the building. The data received outside the building is from an optical line termination (OLT). The PON data wireless transmitted inside the building may be applied to an optical line terminal (ONT) inside the building. Alternatively, the wirelessly received PON data may be converted to Ethernet format and applied to a user interface and/or a gateway interface all inside the building. The wireless transmission of PON data may be via a first transceiver mounted on a surface outside the building and a second transceiver mounted on a surface inside the building. The surface may be a corridor, a window, a door, a walls and a façade.

7 Claims, 11 Drawing Sheets

(51) Int. Cl.
  *H04Q 11/00* (2006.01)
  *H04J 14/02* (2006.01)
  *H04L 12/64* (2006.01)
  *H04L 12/931* (2013.01)

(56) References Cited

U.S. PATENT DOCUMENTS

| | | | | |
|---|---|---|---|---|
| 5,969,837 A * | 10/1999 | Farber | ............... | H04W 88/085 379/56.2 |
| 5,994,998 A * | 11/1999 | Fisher | ............... | H04B 3/542 340/12.3 |
| 6,049,593 A * | 4/2000 | Acampora | ............... | H04B 10/11 379/56.2 |
| 6,205,185 B1 * | 3/2001 | Kajiwara | ............... | H04H 40/90 348/E7.093 |
| 6,314,163 B1 * | 11/2001 | Acampora | ............... | H04B 10/11 379/56.2 |
| 6,486,907 B1 * | 11/2002 | Farber | ............... | H04H 40/90 348/E7.05 |
| 6,647,015 B2 * | 11/2003 | Malkemes | ............... | H04B 7/0845 370/329 |
| 6,831,921 B2 * | 12/2004 | Higgins | ............... | H04L 12/2856 370/338 |
| 6,871,081 B1 * | 3/2005 | Llewellyn | ............... | H04W 88/085 343/770 |
| 6,882,801 B2 * | 4/2005 | Imajo | ............... | H04B 10/25754 398/63 |
| 6,885,845 B1 | 4/2005 | Crowley et al. | | |
| 6,895,185 B1 * | 5/2005 | Chung | ............... | H04B 10/272 398/115 |
| 7,006,847 B2 * | 2/2006 | Sato | ............... | H04W 48/18 370/392 |
| 7,027,431 B1 * | 4/2006 | Thompson | ............... | H01R 27/02 348/E7.05 |
| 7,072,586 B2 * | 7/2006 | Aburakawa | ............... | H04B 10/25753 398/115 |
| 7,135,956 B2 * | 11/2006 | Bartone | ............... | H02J 3/14 340/3.9 |
| 7,136,426 B2 * | 11/2006 | Okada | ............... | H04B 10/25752 370/254 |
| 7,302,224 B2 * | 11/2007 | Sibley | ............... | H04N 7/088 348/E7.031 |
| 7,366,150 B2 * | 4/2008 | Lee | ............... | H04B 10/25752 370/338 |
| 7,369,838 B1 * | 5/2008 | Murray | ............... | H04B 7/15 370/338 |
| 7,409,159 B2 * | 8/2008 | Izadpanah | ............... | H04B 10/1149 379/56.1 |
| 7,450,854 B2 * | 11/2008 | Lee | ............... | H04B 1/7163 380/256 |
| 7,610,050 B2 * | 10/2009 | Sayers | ............... | H04L 63/0407 370/231 |
| 7,814,717 B2 * | 10/2010 | Wang | ............... | H01Q 1/1221 342/359 |
| 7,827,581 B1 * | 11/2010 | Eiger | ............... | H04B 7/1858 370/401 |
| 7,861,272 B2 * | 12/2010 | Russ | ............... | H04L 29/06027 725/131 |
| 7,917,931 B2 * | 3/2011 | Bertonis | ............... | H04L 12/2801 370/319 |
| 7,957,777 B1 * | 6/2011 | Vu | ............... | H04W 4/20 370/311 |
| 7,990,908 B2 * | 8/2011 | Binder | ............... | H04L 12/2803 370/318 |
| 8,098,990 B2 * | 1/2012 | Hu | ............... | H04J 14/0282 370/352 |
| 8,175,459 B2 * | 5/2012 | Thelen | ............... | H04B 10/25752 370/352 |
| 8,184,681 B2 * | 5/2012 | Binder | ............... | H04B 7/15542 307/424 |
| 8,270,833 B2 * | 9/2012 | Lin | ............... | H04J 14/0282 398/115 |
| 8,325,759 B2 * | 12/2012 | Hazani | ............... | H04L 5/06 340/12.32 |
| 8,374,180 B2 * | 2/2013 | Woo | ............... | H04L 12/2838 370/390 |
| 8,374,508 B2 * | 2/2013 | Soto | ............... | H04B 10/272 398/115 |
| 8,401,387 B2 * | 3/2013 | Biegert | ............... | H04L 12/2856 398/117 |
| 8,422,884 B2 * | 4/2013 | Mao | ............... | H04B 10/25752 398/115 |
| 8,548,330 B2 * | 10/2013 | Berlin | ............... | H04B 10/25753 340/2.22 |
| 8,559,939 B2 * | 10/2013 | Sabat, Jr. | ............... | H04W 92/045 455/422.1 |
| 8,639,121 B2 * | 1/2014 | George | ............... | H04B 10/25754 370/328 |
| 8,644,844 B2 * | 2/2014 | Shapira | ............... | G01S 19/48 455/422.1 |
| 8,649,684 B2 * | 2/2014 | Casterline | ............... | H04B 10/25754 398/115 |
| 8,660,477 B2 * | 2/2014 | Murray | ............... | H04B 7/15 370/352 |
| 8,671,431 B2 * | 3/2014 | Centore, III | ............... | H04H 20/63 343/770 |
| 8,677,423 B2 * | 3/2014 | Hicks, III | ............... | H04H 20/63 725/39 |
| 8,682,171 B1 * | 3/2014 | Britz | ............... | H04B 10/1125 398/118 |
| 8,737,454 B2 * | 5/2014 | Wala | ............... | H04B 1/18 375/220 |
| 8,750,266 B2 * | 6/2014 | de Lind Van Wijngaarden | ............... | H04L 12/5692 370/338 |
| 8,761,050 B2 * | 6/2014 | Lu | ............... | H04L 12/2807 370/254 |
| 8,824,457 B2 * | 9/2014 | Bianchi | ............... | H04L 12/2801 370/338 |
| 8,929,740 B2 * | 1/2015 | Smith | ............... | H04B 10/25754 398/115 |
| 8,947,319 B2 * | 2/2015 | Simmons | ............... | H01Q 1/007 174/68.1 |
| 9,258,629 B2 * | 2/2016 | Graves | ............... | H04Q 11/0005 |
| 9,264,741 B2 * | 2/2016 | Murray | ............... | H04B 7/15 |
| 9,307,297 B2 * | 4/2016 | Richman | ............... | H04W 76/026 |
| 9,332,014 B2 * | 5/2016 | Keiser | ............... | H04L 65/4076 |
| 9,332,402 B2 * | 5/2016 | Wala | ............... | H04B 10/25754 |
| 9,344,183 B2 * | 5/2016 | Eiger | ............... | H04B 7/1858 |
| 9,391,723 B2 * | 7/2016 | Matthews | ............... | H04H 20/61 |
| 9,414,137 B2 * | 8/2016 | Smith | ............... | G02B 6/483 |
| 9,419,715 B2 * | 8/2016 | Samsuri | ............... | H04B 10/2503 |
| 9,553,669 B2 * | 1/2017 | Khemakhem | ............... | H04W 88/10 |
| 9,571,190 B2 * | 2/2017 | Britz | ............... | H04B 10/1125 |
| 2002/0122230 A1 * | 9/2002 | Izadpanah | ............... | H04B 10/1121 398/115 |
| 2002/0128009 A1 * | 9/2002 | Boch | ............... | H04W 88/021 455/426.2 |
| 2004/0054425 A1 * | 3/2004 | Elmore | ............... | H04B 10/25752 700/1 |
| 2004/0110468 A1 * | 6/2004 | Perlman | ............... | H04B 7/18517 455/13.3 |
| 2004/0151503 A1 * | 8/2004 | Kashima | ............... | H04B 10/25758 398/115 |
| 2004/0175173 A1 * | 9/2004 | Deas | ............... | H04B 10/25752 398/42 |
| 2004/0203703 A1 * | 10/2004 | Fischer | ............... | H04W 88/10 455/422.1 |
| 2005/0025505 A1 * | 2/2005 | Soto | ............... | H04B 10/25754 398/214 |
| 2005/0289623 A1 * | 12/2005 | Midani | ............... | H04N 7/10 725/100 |
| 2006/0045525 A1 * | 3/2006 | Lee | ............... | H04B 10/25752 398/71 |
| 2007/0019956 A1 * | 1/2007 | Sorin | ............... | H04J 14/0226 398/71 |
| 2007/0112939 A1 * | 5/2007 | Wilson | ............... | H04L 12/2807 709/219 |

(56) References Cited

U.S. PATENT DOCUMENTS

| | | | | |
|---|---|---|---|---|
| 2008/0013957 | A1* | 1/2008 | Akers | H04B 10/2504 398/115 |
| 2008/0063397 | A1* | 3/2008 | Hu | H04J 14/0282 398/43 |
| 2008/0124086 | A1* | 5/2008 | Matthews | H04H 20/61 398/115 |
| 2008/0159744 | A1* | 7/2008 | Soto | H04M 19/08 398/115 |
| 2008/0200122 | A1 | 8/2008 | Mann | |
| 2009/0047016 | A1* | 2/2009 | Bernard | H04L 12/5692 398/43 |
| 2009/0047023 | A1* | 2/2009 | Pescod | H04B 10/25753 398/115 |
| 2009/0060531 | A1 | 3/2009 | Biegert et al. | |
| 2010/0014868 | A1* | 1/2010 | McGlynn | H04B 10/25759 398/115 |
| 2010/0142955 | A1* | 6/2010 | Yu | H04B 10/25754 398/72 |
| 2010/0197222 | A1* | 8/2010 | Scheucher | H01Q 19/30 455/11.1 |
| 2011/0019999 | A1* | 1/2011 | George | H04B 10/25754 398/58 |
| 2011/0055875 | A1* | 3/2011 | Zussman | H04Q 11/0067 725/65 |
| 2011/0200325 | A1* | 8/2011 | Kobyakov | H04B 10/25753 398/25 |
| 2011/0206383 | A1* | 8/2011 | Chien | H04B 10/25759 398/187 |
| 2011/0311033 | A1 | 12/2011 | Binder | |
| 2013/0089336 | A1* | 4/2013 | Dahlfort | H04J 14/0282 398/115 |
| 2013/0201316 | A1* | 8/2013 | Binder | H04L 67/12 348/77 |
| 2013/0266324 | A1* | 10/2013 | Diab | H04L 12/4625 398/116 |
| 2014/0314061 | A1* | 10/2014 | Trajkovic | H04W 16/26 370/338 |
| 2015/0078756 | A1* | 3/2015 | Soto | H04B 10/808 398/116 |
| 2015/0098419 | A1* | 4/2015 | Zavadsky | H04W 88/085 370/329 |
| 2015/0236787 | A1* | 8/2015 | Cook | H04B 10/25753 398/66 |
| 2016/0301474 | A1* | 10/2016 | Bourg | H04B 10/27 |

FOREIGN PATENT DOCUMENTS

| | | |
|---|---|---|
| CN | 203117847 U | 8/2013 |
| CN | 103619080 A | 3/2014 |
| DE | 69130642 T2 | 9/1999 |
| DE | 69704862 T2 | 8/2001 |
| EP | 1250728 B1 | 4/2004 |
| FR | 2838000 A1 | 10/2003 |
| GB | 693435 A | 7/1953 |
| GB | 1418447 A | 12/1975 |
| GB | 2460500 A | 12/2009 |
| JP | 10013121 A | 1/1998 |
| JP | 2000101499 A | 4/2000 |
| JP | 2001069150 A | 3/2001 |
| JP | 2004197993 A | 7/2004 |
| JP | 04256109 B2 | 4/2009 |
| JP | 2011210810 A | 10/2011 |
| JP | 2012018645 A | 1/2012 |
| JP | 05057487 B2 | 10/2012 |
| JP | 2014064360 A | 4/2014 |
| KR | 2005005909 A | 1/2005 |
| KR | 899228 B1 | 5/2009 |
| KR | 900268 B1 | 5/2009 |
| KR | 2010013586 A | 2/2010 |
| KR | 2010016832 A | 2/2010 |
| KR | 2010060321 A | 6/2010 |
| KR | 1044442 B1 | 6/2011 |
| KR | 2011062716 A | 6/2011 |
| KR | 1077532 B1 | 10/2011 |
| KR | 1155568 B1 | 6/2012 |
| KR | 2014004455 A | 1/2014 |
| KR | 1403978 B1 | 6/2014 |
| KR | 2014090002 A | 7/2014 |
| WO | 9631983 A1 | 10/1996 |

OTHER PUBLICATIONS

Llorente, R.; Morant, M.; Beltran, M.; Pellicer, E., "Fully Converged Optical, Millimetre-Wave Wireless and Cable Provision in OFDM-PON FTTH Networks," Transparent Optical Networks (ICTON), 2013 15th International Conference on, pp. 1-4, Jun. 23-27, 2013.

Examination Report for European Patent Application No. 13709679.8, dated May 11, 2017, 5 pages.

* cited by examiner

FIBER-WIRELESS SYSTEM AND METHODS FOR SIMPLIFIED AND FLEXIBLE FTTX DEPLOYMENT AND INSTALLATION

CROSS-REFERENCE TO RELATED APPLICATIONS

This application claims the benefit of priority to U.S. Provisional Application No. 62/144,614, filed on Apr. 8, 2015, and is incorporated herein by reference.

BACKGROUND

The disclosure relates generally to a passive optical network (PON) system and more particularly to providing a subscriber or customer with access to a passive optical network (PON) via fiber to a dwelling or home, in an office or in another location.

High definition video distribution and high speed internet data access have been driving the bandwidth demand of internet subscribers inside homes, office and other premises over the past years. Twisted pair and other copper based access technology have difficulty meeting the bandwidth requirement for a good quality of services. In contrast, optical fiber-to-the-home (FTTH), fiber-to-the-business or building (FTTB), fiber to the node (FTTN), fiber to the curb or cabinet (FTTC), and fiber-to-the-premises (FTTP) systems, for example, provide a sustainable optical fiber-based solution to deliver high speed, high bandwidth services for data, voice, and video access. Today, many broadband access solutions are enabled by such FTTH/FTTB/FTTN/FTTC/FTTP, also known here as FTTX solutions, all over the world.

In today's FTTX deployments, a critical step is to physically access the building or premises of the subscribers, such as individual houses, apartments or multi-dwelling units (MDUs). Such physical access includes, but is not limited to, a technician entering the subscriber's premises, drilling holes through building walls, installing and commissioning the fibers and hardware inside the premises, and so forth. The terms "building" and "premise" are used interchangeable in this disclosure to connote a building having end-user devices on a Passive Optical Network (PON) for single family unit (SFU), multiple-family (MFU) or other service delivery of voice, data, video, etc, services.

Without such physical access, the installers cannot deploy or maintain the physical infrastructure and enable the service subscription. The need for physical access to the installation premises can be a major impediment due to the fact that such physical access may involve multiple site access authorizations (from apartment owners, building owners, etc.). It also requires more labor and is more costly for the service provider to physically install the infrastructure, and results in inconvenience and disturbance to the daily life of the subscribers. As a result, such physical access to the premises can lead to a higher cost of deployment, less customer satisfaction, a slower deployment process, and the like. In some cases, gaining access can be the primary concern that inhibits the whole service deployment.

What is needed is a better way to improve the distribution and installation of high-speed communications to consumers in a variety of homes, businesses and premises.

SUMMARY

One embodiment of the disclosure relates to a passive optical network system. The system includes at least one optical fiber coupled to an optical line termination (OLT) of a PON. At least one first transceiver outside a building is communicatively coupled to a terminal end of the at least one optical fiber. The at least one first transceiver is configured for wirelessly transmitting to and receiving data from the PON. At least one second transceiver inside the building is configured to wirelessly transmit to and receive data from the at least one first transceiver. The system also includes a module for implementing a user interface, a module for implementing a radio frequency (RF) to Ethernet conversion and a module for implementing a gateway interface. The user interface module, the RF to Ethernet conversion module, and the gateway interface module are communicatively coupled to the at least one second transceiver and configured for transmitting to and receiving data from the PON.

Another embodiment of the disclosure also relates to a passive optical network. The passive optical network (PON) system includes an optical line termination (OLT) of a PON outside a building, an optical network terminal (ONT) of a PON inside the building and a transceiver bridge disposed between the OLT and the ONT. The transceiver bridge includes at least one first transceiver outside the building communicatively coupled to the OLT and configured for wirelessly transmitting and receiving data from the PON and at least one second transceiver communicatively coupled to the ONT and configured to wirelessly transmit and receive data from the at least one first transceiver.

Another embodiment of the disclosure also relates to a passive optical network. The passive optical network (PON) system includes an optical line termination (OLT) of a PON outside a building, an optical network terminal (ONT) of a PON outside the building, the ONT communicatively coupled to the OLT and at least one first transceiver outside the building communicatively coupled to the ONT and configured for wirelessly transmitting to and receiving data from the PON. The passive optical network system also includes at least one second transceiver inside the building configured to wirelessly transmit to and receive data from the at least one first transceiver, and also includes a module for implementing a user interface, a module for implementing a radio frequency (RF) to Ethernet conversion and a module for implementing a gateway interface. The user interface module, the RF to Ethernet conversion module and the gateway interface module are communicatively coupled to the at least one second transceiver and configured for transmitting to and receiving data from the PON.

An additional embodiment of the disclosure relates to a method. The method includes receiving data from a passive optical network (PON) outside a building, wirelessly transmitting the received PON data to inside the building and applying the received PON data to a network inside the building.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Figure 1:
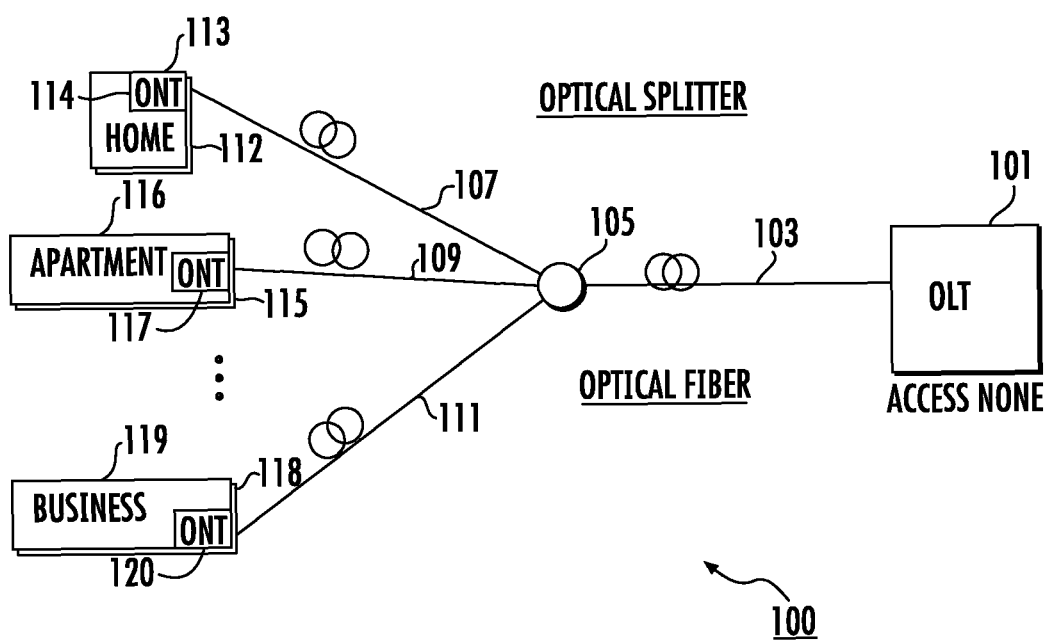
FIG. 1 is a prior art distribution system to a building with an optical fiber passing through a wall of the building.

This disclosure provides a simple and cost-effective solution that avoids a requirement for physical access to the premises. The disclosed solution utilizes wireless technology to bridge the connectivity between indoor devices at a location or premises, such as an optical network terminal (ONT) or Customer Premises Equipment (CPE), and any outdoor network hardware or infrastructure that carries the data from the optical line termination (OLT) in a passive-optical-network (PON). The present disclosure may also be used in conjunction with an active-optical-network. Uplink and downlink wireless connectivity through a wall replaces a physical optical fiber penetration through the building structure. Conventionally, the physical penetration goes through a wall or the frame of a window, for example. The present disclosure uses paired radio transceivers and avoids the problems associated with physical optical fibers going through walls or the frame of windows of an installation building, which may require, for example, drilling through the wall or the frame of a window by highly trained technical staff.

This disclosure avoids any need for a physical fiber to go through the walls of a building or premises by utilizing wireless connectivity across building partitions, such as walls, windows and the like. The wireless links having the required dedicated capacity are used to provide the required outside-to-inside (and vice versa) connectivity across the building partitions. This provides the subscriber or customer in the last mile, i.e., at the far end of the network, with complete broadband network access, that is, with access to a passive optical network (PON) via, for example, fiber to the home (FTTH), fiber to the business or building (FTTB), fiber to the node (FTTN), fiber to the curb or cabinet (FTTC), or fiber to the premises (FTTP), the group abbreviated herein as "FTTX." The required hardware inside the subscriber's premises is attached to (or placed near) a transceiver inside the building (window or wall), which then connects wirelessly to a matching transceiver placed outside the same building partition, the second or matching hardware either attached to or placed near the partition or wall. The transceiver on the outside of the partition is then connected to the traditional optical fiber FTTX infrastructure through PON networks. The wireless connection provides logical transparency to both the end user and the network operator in terms of functionality.

This disclosure changes the final link of the optical network, such as a passive optical network, to the user or subscriber. The network or service provided remains the same, with the same bandwidth connection as before. The difference between this disclosure and conventional systems is that the optical fiber itself does not penetrate the wall or window frame of the user's location. With a robust and reliable pair of matching transceivers as disclosed herein, the transitions and links from the PON network to devices inside of a premise are transparent to the user in terms of speed and access and network reliability.

FIG. 1 depicts a prior art distribution system to a building with an optical fiber penetrating a wall of the building. This typical FTTX deployment 100 employs passive optical network technology, with the optical fibers penetrating the building partition such as walls 112, 115, 118. The optical line termination (OLT) 101 occurs outside the subscriber's building or premises. The optical line terminations of the network are within the operator's access network and may be located in the central office of FTTX service provider. In this example, optical line termination (OLT) 101 may provide several services via an optical fiber 103.

As seen in FIG. 1, the optical line termination 101 from an access node (not shown) routes communications via the optical fiber 103 (e.g., a single or pair of optical fibers) to an optical combiner/splitter 105. In this example, the optical combiner/splitter 105, which may be as in this example a 1:32 optical combiner/splitter, for example, splits or distributes the signals on the optical fiber 103 to up to 32 separate optical fibers for customers or users. Each of these 32 optical fibers may be routed to a separate premises, such as a home 113, an apartment 116, and a business 119 building or an office. FIG. 1 illustratively depicts three optical fibers 107, 109, and 111 routed to home 113, apartment 116, and business 119, respectively. It is understood that the combiner/splitter 105 also acts as a combiner, combining uplink signals from the optical fibers 107, 109, and 111 from user locations (e.g., the 32 optical fibers) onto the single optical fiber 103 to send through optical line termination (OLT) 101 to the optical network for distribution to users at other terminal points of the optical network. In order to combine more than one signal on an optical fiber, the communications may be multiplexed.

Each of optical fibers 107, 109, and 111 terminates at optical network terminal (ONT) 114, 117, and 120 located in the home 113, the apartment 116, and the business 119, respectively. Further, each of optical fibers 107, 109, and 111 used in the FTTX deployment is seen to go through or to penetrate the partitions 112, 116, and 118 of the home 113, the apartment 116, and the business 119, respectively. These partitions 112, 116, and 118 through which the optical fibers must pass are illustratively walls or the frame holding the window. While the FTTX deployment depicted in FIG. 1 provides a very good connection, it is also costly. By some estimates, it can cost $850 and up to connect each home or premises to an optic fiber in this manner.

Having thus introduced background on the general configuration of optical networks and distribution of communications systems, we now turn to communications systems and method that are provided by this disclosure. Broadly speaking, the present disclosure teaches a method and system implementations thereof that include receiving data from a passive optical network (PON) outside a building; wirelessly transmitting the received PON data to inside the building; and applying the received PON data to a network inside the building. The data received outside the building is from an optical line termination (OLT). An optical line termination is within the access network of the provider or operator and may be located at a central office or head-end unit. Data from the network inside the building is also uplinked to the OLT over the PON. The PON data wireless transmitted inside the building may be applied to an optical line terminal (ONT) inside the building. Alternatively, the wirelessly received PON data may be converted to Ethernet format and applied to a user interface and/or a gateway interface all inside the building. The wireless transmission of PON data may be via a first transceiver mounted on a surface outside the building and a second transceiver mounted on a surface inside the building. The surface may be a corridor, a window, a door, a walls and a façade.

Advantageously, this disclosure avoids the need for optical fibers to go through or penetrate partitions or walls of a customer's home or premises because the PON data is bi-directionally transmitted across the partitions or walls wirelessly. The installer can thus avoid a very time-intensive and cost-intensive installation of optical fibers through partitions or walls of a premises when deploying communications distribution systems.

Figure 2:
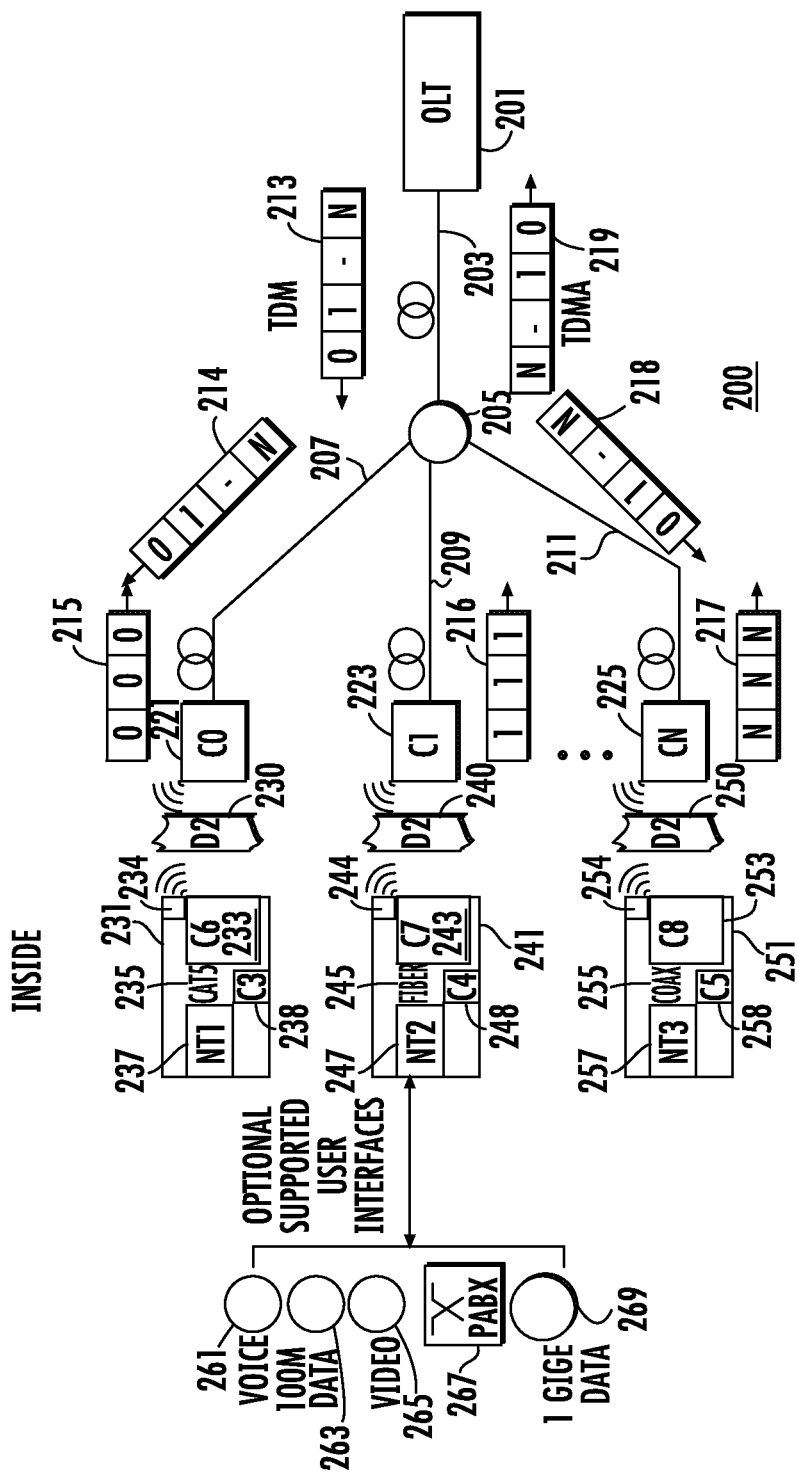
FIG. 2 is an embodiment of an illustrative first system architecture of this disclosure.

FIG. 2 depicts an illustrative passive optical network 200 of this disclosure. The system 200 includes at least one optical fiber 203 coupled to an optical line termination (OLT) 201 of a PON. At least one first transceiver 221, 223, and 225 outside a building is communicatively coupled to a terminal end of the at least one optical fiber. The at least one first transceiver 221, 223, and 225 is configured for wirelessly transmitting to and receiving data from the PON. At least one second transceiver 234, 244, and 254 is located inside buildings 231, 241, and 251, respectively. Second transceiver 234, 244, and 254 are configured to wirelessly transmit to and receive data from the at least one first transceiver 221, 223, and 225, with which it is associated. The system also includes a module for implementing a user interface 233, 243, and 253, a module for implementing a radio frequency (RF) to Ethernet conversion 238, 248, and 258, and a module for implementing a gateway interface 237, 247, and 257. The module for implementing the user interface 233, 243, and 253 are user interfaces that are further explained later. The module for implementing a radio frequency (RF) to Ethernet conversion 238, 248, and 258 is a conventional RF to Ethernet converter. The module for implementing a gateway interface 237, 247, and 257 accommodates different user Residential gateways with end-user device interfaces such as POTS 261, 100BaseT 263, 1000BaseT 269, IP-Video 265, PABX 267. Other optional interfaces 260 may be provided such as an interface for television or other future end-user interfaces not currently defined. These end-user device interfaces couple to user devices (not shown) which enable a user to access the indicated media. As shown in FIG. 2, the user interface 233, 243, and 253 may be connected to gateway interface 237, 247, and 257 using Coax 255, Fiber 245 and CAT5 235.

The user interface module, the RF to Ethernet conversion module, and the gateway interface module are communicatively coupled to the at least one second transceiver 234, 244, and 254 and are configured for transmitting to and receiving data from the PON. This first and second associated transceiver pairs allow PON data to be advantageously bi-directionally transmitted wirelessly across partitions 230, 240, 260. This avoids the need for the optical fibers 207, 209, and 211 to have to pass through partitions 230, 240, 260 at great time and expense to the provider.

FIG. 2 has been drawn in detail to disclose the functionality of the system. One or more functionalities of this disclosure, and FIG. 2, may be bundled together and implemented with very compact circuitry and hardware. For example, the first transceiver and the second transceiver are an RF transceiver that may take the form of a very small microcircuit. The microcircuit may further include an integral physical layer interface, such as an Ethernet converter, and a simple output comprising one or more twisted wire pairs or coax cable. The microcircuit may be mounted on a small circuit board with a connector and a place for a battery or a power supply. In some instances, the RF transceiver may be bundled together with an output network terminal (ONT) to perform user interface 233, 243, and 253 functionalities, the radio frequency (RF) to Ethernet conversion 238, 248, and 258 functionalities, and the gateway interface 237, 247, and 257 functionalities. In this example, the foregoing functionalities and all necessary conversions there between may co-exist on a very small circuit board or module.

It should be understood that end-user devices are not limited to these embodiments. For instance, each customer user interface described above uses only a single medium for input/output to the user's premises (e.g., optical fiber 245, CAT5 235, or coax cable 255). However, user interfaces in a premise may include more than a single medium optical fiber 245, CAT5 235, or coax cable 255. The user interfaces may include a combination of an optical fiber a coaxial output, or a fiber optic output and a Gigabit Ethernet CAT5 output (twisted pair or pairs), and so forth. In a similar manner, it should be understood that each user interface in a premise may support a plurality of input/output end-user devices. As shown in FIG. 2, each Residential gateway 237, 247, 257 with end-user device interfaces may have a two-way connection to a plurality of end-user devices. For example, Residential gateway 237 may support voice communications 261 with a cell phone (not shown) on premise 231 while also supporting 100 M data communications 263, video communications 265, PABX 267 and high-speed 1 Gigabit data 269 with a computing device such as a personal computer, a laptop, a tablet, or a smart phone also on premise 231. Each of these end-user devices is supported by an appropriate gateway, Residential gateway 237 in this example that provides the user interfaces.

The Residential gateway 237, 247, 257 may include interfaces suitable for POTS (privately-owned telephone system or plain old telephone service), 100 BaseT (fast internet for twisted pair cable), 1000BaseT (fast internet with four pairs of CAT5 unshielded twisted pairs), an IP-Video interface, Cable TV interface, a PABX interface, and so forth. Other suitable interfaces may be used for compatibility with these and/or other end-user devices.

Services that may be provided to the premises 231, 241, 251 may include narrow band (NB) communication and broad band (BB) communications. Narrow band communications from the network may be provided to OLT 201 via an E1 line or a T1 line, with capabilities, respectively, of 2048 Mbit/s and 1554 Mbit/s. Broad band services may be provided to OLT 201 via a Gigabit Ethernet cable and may utilize synchronous transport module or an optical carrier. These inputs may also be connected via a cross connector (CC) through a single access node. The access node may also include the previously identified optical line terminal output typically to nearby subscribers. Services typically available include all normal and customary communications services provided through passive optical networks. These services may include voice communications, such as telephone, VOIP services and private automatic branch exchange (PABX) switchboard services, video services, data services, such as internet or other data services. In FIG. 2, as in all other examples, each connection to an optical network terminal (ONT) may have the ability to have its signal routed to other connections or nodes throughout the optical network.

In operation, the passive optical network, from the right-hand side of the figure, routes communications to first transceiver 221, 223, and 225, which in this example are associated with several customers, indicated as C0, C1 . . . Cn. The passive optical network (PON) 200 includes the optical line termination (OLT) 201 providing network access via the optical fiber 203 to a splitter/combiner 205, similar to the splitter/combiner previously discussed. On the downlink path, the splitter/combiner 205 splits the signals on optical fiber 203 depicted as signal 213 into three signals, one applied to each separate optical fibers 207, 209, 211. Only downlink signal 214 applied to optical fiber 207 and downlink signal 218 applied to optical fiber 211 are shown in the figure. On the uplink path, the splitter/combiner combines the signals 215, 216, 217 on optical fibers 207, 209, 211 into a single signal 219 on optical fiber 203 for transmission to the optical line termination (OLT).

FIG. 2 depicts the scheme for the signals on optical fibers 207, 209, and 211 sharing the same frequency channel on optical fiber 203 as time division multiplexing (TDM) and time division multiple access (TDMA). Alternatively, wave division multiplexing (WDM) and wave division multiple access (WDMA) and other schemes for channel sharing may also be used with this disclosure. As previously explained, the associated pair of first transceiver 221, 223, and 225 and second transceiver 234, 244, and 254 allow PON data to be advantageously bi-directionally transmitted wirelessly across partitions 230, 240, 260. This avoids the need for the optical fibers 207, 209, and 211 to have to pass through partitions 230, 240, 260 at great time and expense to the provider.

More specifically, the optical line terminal (OLT) 201 acts as an access node to communications services with an optical fiber output 203. The services may be multiplexed. For example, digital time division multiplexing (TDM) 213 and analog time division multiple access (TDMA) 217 services may be provided through the optical fiber 203. The optical fiber and the multiplexing may be used both for downlinks to the user from the services and uplinks from the user to the services, although multiplexing may not be required or used for downloads. Other convenient ways to multiplex the signals may also be used, e.g., wavelength division multiplexing (WDM) and wave division multiple access (WDMA). Multiplexing of downlink signals 213 is shown in FIG. 2, the signals having a left-ward pointing arrow, by dividing the signals into packets labeled 0, 1,—and n, indicating that each user sees the same incoming signal, but the individual's equipment detects and decodes only those signals intended for the user. Uplink signals 215, 216, 217 are shown as a series of packets with right-ward pointing arrows, labeled only from the originating user, e.g., 0-0-0, 1-1-1 or n-n-n. Note that when the uplink signals are multiplexed by combiner/splitter 205, the resulting signal 219 again shows separate packets labeled according to the user of origin, that is, 0, 1,—or n. Encryption may be used in the passive optical network and for communications downloaded to users. Encryption may also be used in communications and message uploaded from users for distribution through the network.

In the example of FIG. 2, uplink communications from the users to the optical network and downlink communications from the network to the user may illustratively have a maximum bit rate, either way, of 2488 Gbit/s. Illustratively, upstream signals may use light signals with a wavelength of 1310 nm±50 nm. If the optic fiber uses two fibers, the downstream fiber may use light signals with a wavelength of 1310 nm±50 nm. If the optic fiber uses a single fiber, the downstream fiber also uses light signals with a wavelength of 1490 nm±50 nm. Light signals of other wavelengths may also be used. These details are not shown in the figures are a matter of design choice based upon specific embodiments and applications of this disclosure. In some embodiments, up to 20 km of physical reach is contemplated from the access node, such as OLT 201, to building premises 231, 241, 251. Longer distances may be achieved through active optical networks, optical amplification of signals and other known techniques. The foregoing illustrative example may be illustrative of GPON technology given the speeds and lambda's defined. It will be appreciated that any downstream lambda, downstream bandwidth and upstream lambda, upstream bandwidth may be used with this disclosure.

In some embodiments, the electrical signal may have a very high speed, supporting the GPON/EPON standard of up to 2.5 m Gbit/sec or Gbps or higher. It will be appreciated that this disclosure is not limited to the GPON/EPON standard and that this disclosure may be implemented using other standards as well. The wireless transceivers can be, in one example, in the frequency band of 5 GHz or 60 GHz (in the millimeter band). The wireless transceivers can be implemented in WiFi chipsets for the IEEE 802.11ac or 802.11ad standard. Speed in communications may also be assisted by using ISM (Industrial, Scientific and Medical) modems that can support very high data rates, such as WiGig at 4.7 Gbit/sec. One or more modems may be used as a PHY layer in the radio transmissions for this and for other embodiments. With wireless links, attention should be paid to quality of service (QoS) and latency indicators so as not to impact the performance, for instance, of the PON network. Other normal operational aspects may also require attention. It is understood that in the present context, these services are delivered via fiber to the customer.

Once the optical network termination has reached into each home or premises, the communications may be further distributed inside as desired. Thus, an optical signal may be routed to each desired point in the home or building as the owner or user wishes. Alternatively, an optical network terminal or circuitry with similar functionality may be used to convert the incoming or downlink optical signal to an electrical signal for further distribution. In these examples, the electrical signals may then be distributed to user devices, such as telephones, computers, televisions, a switchboard, and so forth. The optical network terminal or circuitry with similar functionality may also be used for uplinks, that is, for taking electrical signals from the end-user devices on premises 231, 241, 251 and converting them to optical signals for uplink to the optical network and a destination desired by the user.

Figure 3:
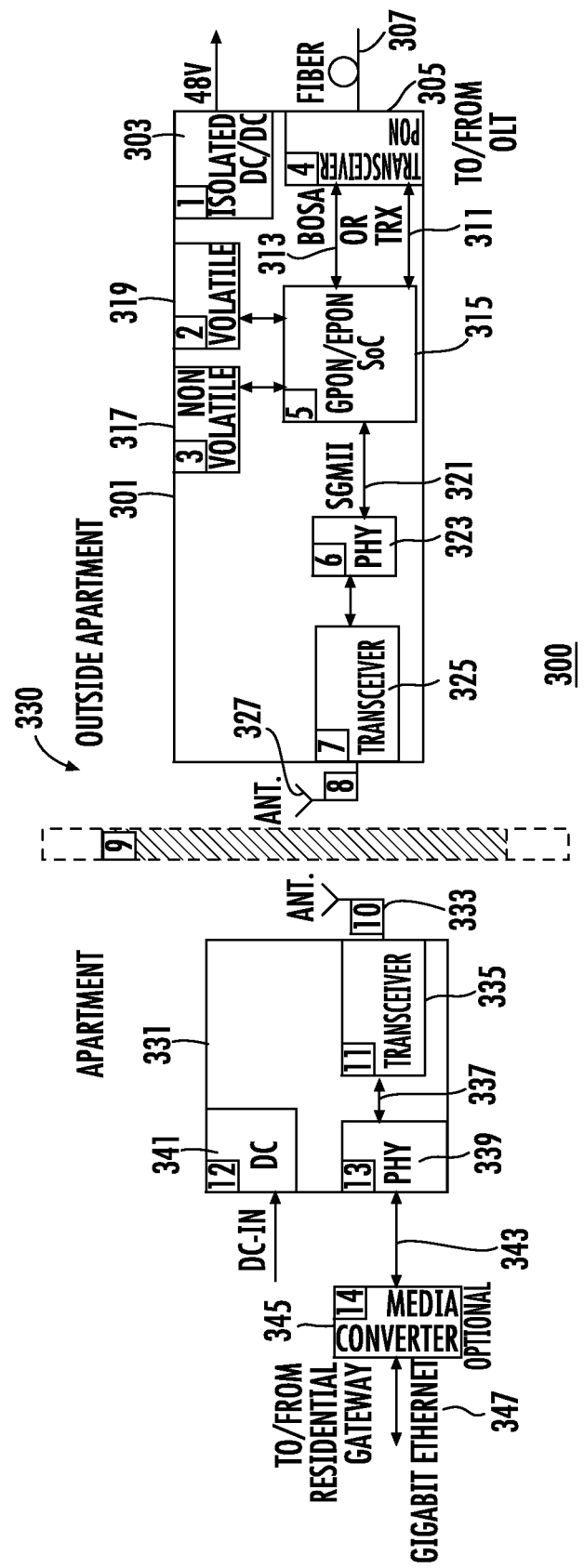
FIG. 3 is a first implementation of the embodiment of FIG. 2.

FIG. 3 depicts an illustrative embodiment of the passive optical network of this disclosure depicted in FIG. 2. The system 300 includes at least one optical fiber 307 coupled to an optical line termination (OLT) (not shown) of a PON. A first component box 301 is located outside a premises. The component box 301 includes at least one first transceiver 325 outside the premises that is communicatively coupled to a terminal end of the at least one optical fiber 307. The at least one first transceiver 325 is configured for wirelessly transmitting to and receiving data from the PON. Wireless transmission of PON data occurs over antenna 327.

Inside the building is a second component box 331. The second component box 331 includes at least one second transceiver 335 which is located inside the building. Second transceiver 335 is configured to wirelessly transmit to and receive data from the at least one first transceiver 325, with which it is associated. Wireless transmission of PON data occurs over antenna 333.

The first component box further comprises a PON system on a chip (PON SoC) 315 and a PON transceiver 305 connected thereto. A physical (PHY) layer 323 provides a physical connection between the PON SoC 315 and the transceiver 325. The PON SoC 315 is adapted to provide an SGMIII interface 321 to the PHY layer 321. The PON transceiver 305 is adapted to receive the at least one optical fiber 307. The PON SoC 315 and the PON transceiver 305 bidirectionally communicate using a bidirectional optical subassembly interface (BOSA Interface) 313 or a transceiver interface (TRX Interface) 311 or other optical interface.

The first component box further comprises a memory that is illustratively selected from the group consisting of a volatile memory 319 and a non-volatile memory 317. In one embodiment, the non-volatile memory may be a random access memory (RAM) chip, such as DDR2 SDRAM memory (double data rate synchronous dynamic RAM). The volatile memory may be flash memory, such as an EEPROM. Other types of memories may be used.

The first component box further comprises a power source 303 which may be a DC/DC isolated power source. The power source may also be powered by an AC-to-DC converter. Power source 303 may receive power from an outside source, such as 48 VDC or other suitable voltage, and convert the power to voltages or forms suitable for use inside the terminal, such as 5 VDC, 3.3 VDC, or as desired. Power to the terminals may be supplied in other ways, such as one or more batteries, with any needed changes in voltage provided by an on-board DC/DC converter or other power supply circuit.

While a Serial Gigabit Media Independent Interface (SGMII) interface and a physical (PHY) layer are shown, it will be appreciated that any PHY/MAC interface may be employed to provide the bidirectional communication between the at least one first transceiver 325 and the PON transceiver 305.

The second component box 331 further comprises a power source 341 which may be a DC/DC isolated power source. The power source may also be powered by an AC-to-DC converter. The second component box 331 further comprises a physical (PHY) layer 339 for physically connecting the transceiver 335 to a user interface (depicted as 233, 243, and 253 in FIG. 2), a module for implementing a radio frequency (RF) to Ethernet conversion (depicted as 238, 248, and 258 in FIG. 2), and a module for implementing a gateway interface (depicted as 237, 247, and 257 in FIG. 2). The module for implementing the user interface, the module for implementing a radio frequency (RF) to Ethernet conversion, and the module for implementing a gateway interface to accommodate different user Residential gateways with interfaces such as POTS 261, 100BaseT 263, 1000BaseT 269, IP-Video 265, PABX 267, and so on are as previously described in FIG. 2. An optional media converter 345 may be provided to provide further functionality to convert PON data to other media formats.

Advantageously, the first and second associated transceiver pairs of this disclosure allow PON data to be bi-directionally transmitted wirelessly across partition 330. This avoids the need for the optical fiber 307 to have to pass through the partition at great time and expense to the provider to implement.

Note that some PHY interfaces or layers may take the form of an integrated circuit or chip to effect the transformation of a signal. These may include a chip for a PCI-e (peripheral component interconnect express) PHY interface or layer. A chip may be used as a PHY layer for other interfaces or layers, such as for an Ethernet PHY layer, a USB PHY chip, an SDRAM chip for non-volatile memory, a flash memory chip interface for volatile memory, and so forth.

Figure 4:
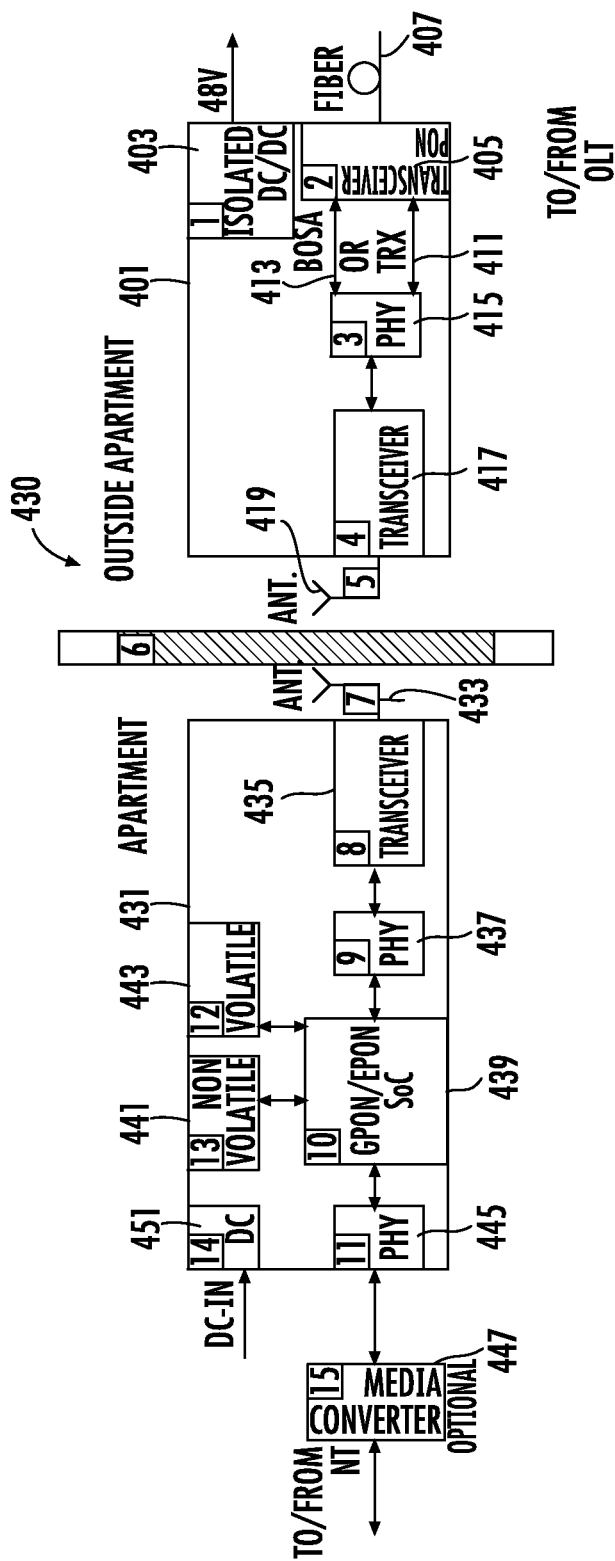
FIG. 4 is a second implementation of the embodiment of FIG. 2.

FIG. 4 is a second implementation of the embodiment of FIG. 2. The system 400 includes at least one optical fiber 407 coupled to an optical line termination (OLT) (not shown) of a PON. A first component box 401 is located outside a building. The component box 401 includes at least one first transceiver 417 outside the building that is communicatively coupled to a terminal end of the at least one optical fiber 407. The at least one first transceiver 417 is configured for wirelessly transmitting to and receiving data from the PON. Wireless transmission of PON data occurs over antenna 419.

Inside the building is a second component box 431. The second component box 431 includes at least one second transceiver 435 which is located inside the building. Second transceiver 435 is configured to wirelessly transmit to and receive data from the at least one first transceiver 417, with which it is associated. Wireless transmission of PON data occurs over antenna 433.

The first component box further comprises a PON transceiver 405 connected thereto. A physical (PHY) layer 415 provides a physical connection between the transceiver 417 and the PON transceiver 405. The physical (PHY) layer 415 and the PON transceiver 405 bidirectionally communicate using a bidirectional optical subassembly interface (BOSA Interface) 413 or a transceiver interface (TRX Interface) 411 or other optical interface. The PON transceiver 405 is adapted to receive the at least one optical fiber 407. The first component box further comprises a power source 403 which may be a DC/DC isolated power source. The power source may also be powered by an AC-to-DC converter.

The second component box 431 further comprises a PON system on a chip (PON SoC) 439 and a transceiver physical (PHY) layer 437, 445. Physical layer (PHY) 437 provides a physical connection between the PON SoC 439 and the transceiver 435. The second component box 431, also known as an inside terminal, includes memory accessible to the SoC, memory that is illustratively selected from the group consisting of a volatile memory 443 and a non-volatile memory 441.

Physical layer (PHY) 445 provides a physical connection between the PON SoC 439 and a user interface (depicted as 233, 243, and 253 in FIG. 2), a module for implementing a radio frequency (RF) to Ethernet conversion (depicted as 238, 248, and 258 in FIG. 2), and a module for implementing a gateway interface (depicted as 237, 247, and 257 in FIG. 2). The module for implementing the user interface, the module for implementing a radio frequency (RF) to Ethernet conversion, and the module for implementing a gateway interface to accommodate different user Residential gateways with interfaces such as POTS 261, 100BaseT 263, 1000BaseT 269, IP-Video 265, PABX 267, and so on are as previously described in FIG. 2. An optional media converter 447 may be provided to provide further functionality to convert PON data to other media formats.

Advantageously, the first and second associated transceiver pairs of this disclosure allow PON data to be a bi-directionally transmitted wirelessly across partition 430. This avoids the need for the optical fiber 407 to have to pass through the partition at great time and expense to the provider to implement.

Figure 5:
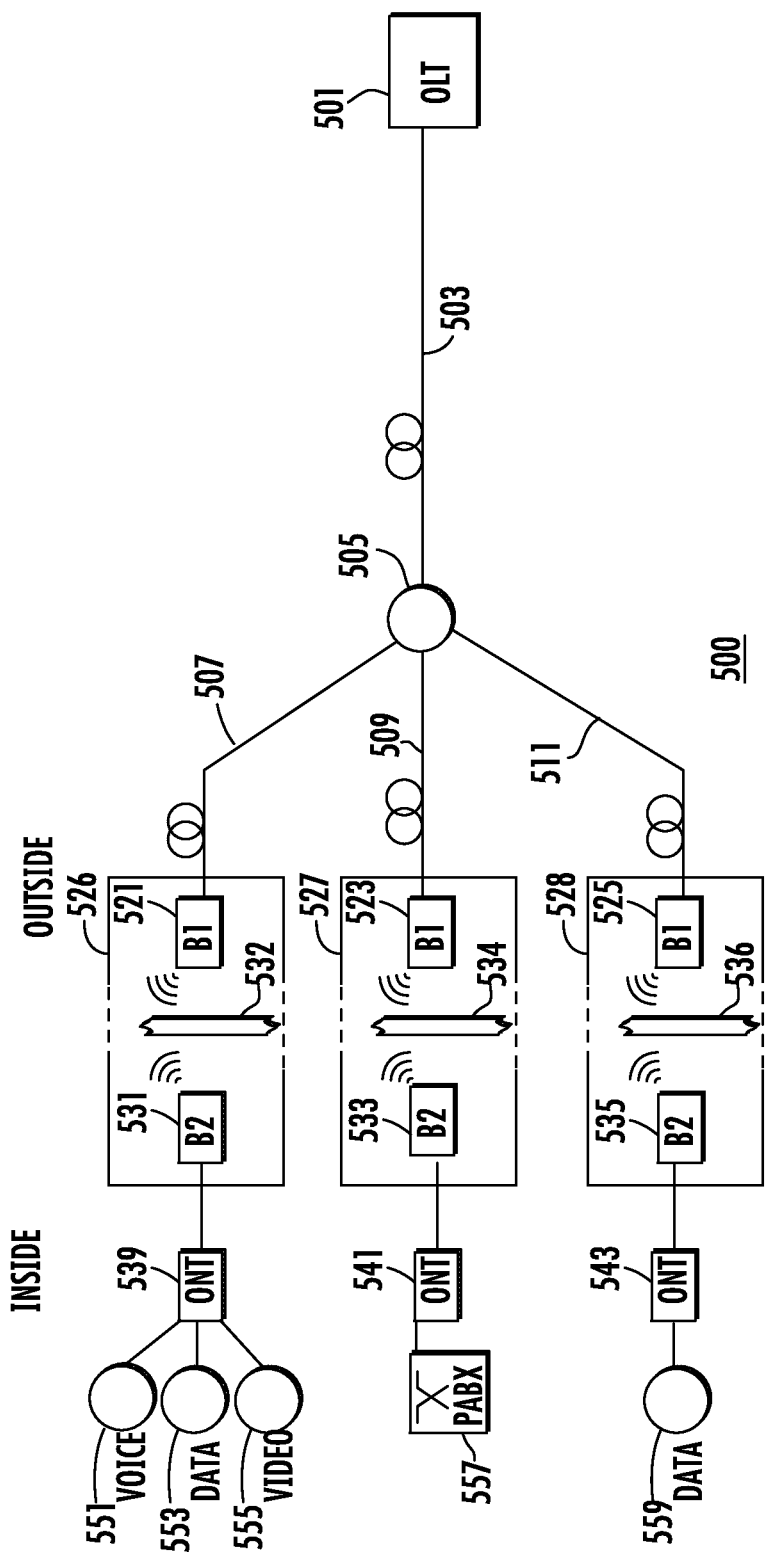
FIG. 5 is an embodiment of an illustrative second system architecture of this disclosure.

FIG. 5 is an embodiment of an illustrative second system architecture of this disclosure. Passive optical network (PON) system 500 includes an optical line termination (OLT) 501 of a PON outside a building, an optical network terminal (ONT) 539, 541, 543 of a PON inside the building and a transceiver bridge 526, 537, 528 disposed between the OLT 501 and the ONT 539, 541, 543. The transceiver bridge 526, 537, 528 includes at least one first transceiver 521, 523, 525 outside the building communicatively coupled to the OLT 501 and configured for wirelessly transmitting and receiving data from the PON and at least one second transceiver 531, 533, 535 communicatively coupled to the ONT 539, 541, 543 and configured to wirelessly transmit and receive data from the at least one first transceiver.

The optical line termination (OLT) 501 provides network access via the optical fiber 503 to a splitter/combiner 505, similar to the splitter/combiner previously discussed. On the downlink path, the splitter/combiner 505 splits the signals on optical fiber 503 into three signals, one applied to each separate optical fibers 507, 509, 511. On the uplink path, the splitter/combiner combines the signals on optical fibers 507, 509, 511 into a single channel on optical fiber 503 for transmission to the optical line termination (OLT) 501.

The optical network terminal (ONT) 539, 541, 543 provides a user interface (depicted as 233, 243, and 253 in FIG. 2), a module for implementing a radio frequency (RF) to Ethernet conversion (depicted as 238, 248, and 258 in FIG. 2), and a module for implementing a gateway interface (depicted as 237, 247, and 257 in FIG. 2). The module for implementing the user interface, the module for implementing a radio frequency (RF) to Ethernet conversion, and the module for implementing a gateway interface to accommodate different user Residential gateways with interfaces such as POTS 261, 100BaseT 263, 1000BaseT 269, IP-Video 265, PABX 267, and so on are as previously described in FIG. 2. More specifically, in FIG. 5, optical network terminal (ONT) 539 is depicted with a POTS 551 interface, 100BaseT 553 interface, and IP-Video 555 interface; optical network terminal (ONT) 541 is depicted with a PABX 557 interface; and optical network terminal (ONT) 543 is depicted with a 1000BaseT 559 interface.

Advantageously, the associated pair of first transceiver 521, 523, and 525 and second transceiver 531, 541, and 543 allow PON data to be bi-directionally transmitted wirelessly across partitions 532, 534, 536. This avoids the need for the optical fibers 507, 509, and 511 to have to pass through partitions 532, 534, 536 at great time and expense to the provider to implement.

Figure 6:
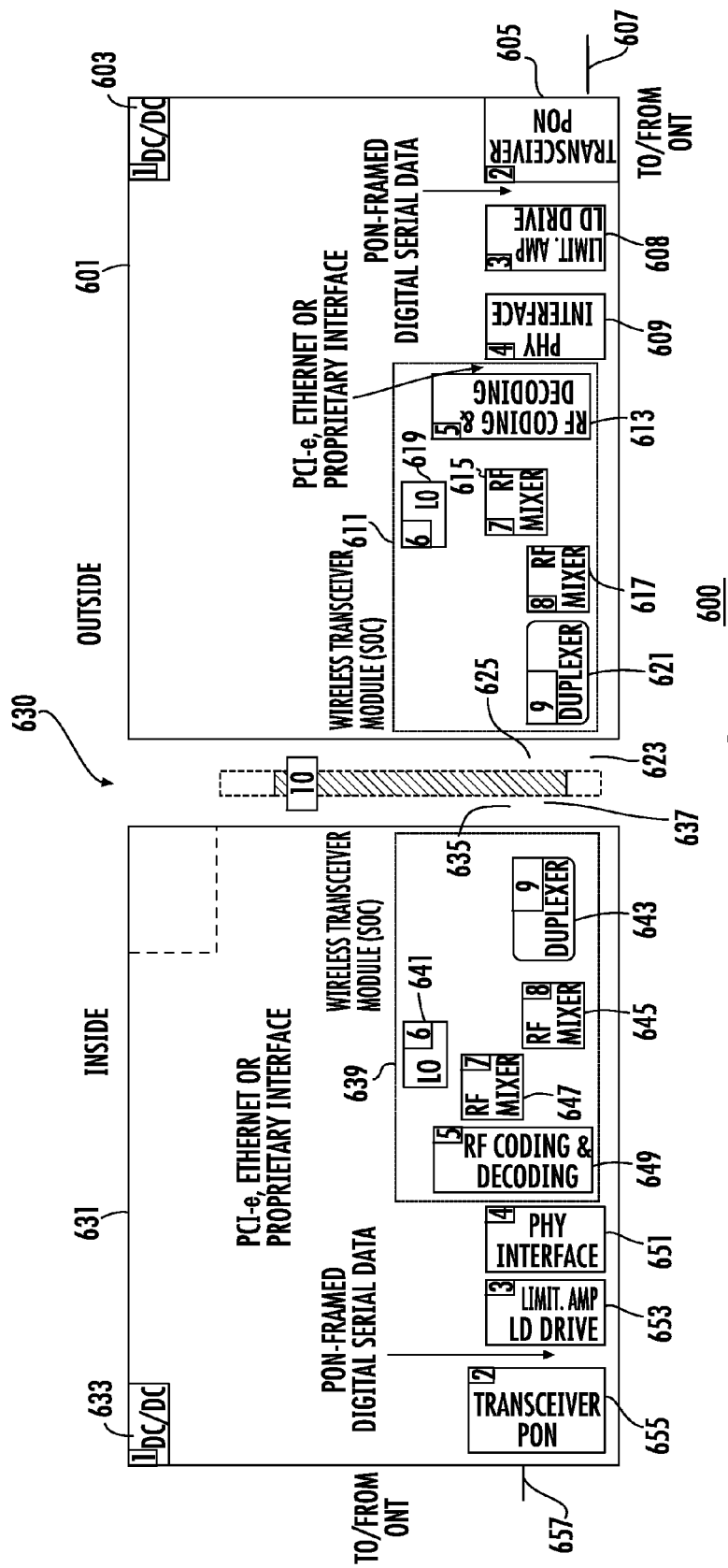
FIG. 6 is an implementation of the embodiment of FIG. 5.

FIG. 6 is an implementation of the embodiment of FIG. 5. A first component box 601 is located outside a building. The component box 601 includes at least one first transceiver 611 outside the building that is communicatively coupled to a terminal end of the at least one optical fiber 607. The at least one first transceiver 611 is configured for wirelessly transmitting to and receiving data from the PON. Wireless transmission occurs via path 623 and antenna 625.

Inside the building is a second component box 631. The second component box 631 includes at least one second transceiver 634 which is located inside the building. Second transceiver 634 is configured to wirelessly transmit to and receive data from the at least one first transceiver 611, with which it is associated. Wireless transmission occurs via path 637 and antenna 635.

Each of the first transceiver 611 and the second transceiver 639 comprises an RF codex 613, 649, respectively, which transforms an optical signal into a radio frequency signal and vice versa. Each transceiver further comprises a local oscillator 619, 641, respectively, which generates a carrier frequency; an RF mixer 615 and 647, respectively which is a circuit that mixes the frequency of the data with the carrier frequency; and a duplexer 621, 637, respectively which is a circuit that provides for bidirectional communication over the same communication link.

The first component box further comprises a PON transceiver connected thereto. A physical (PHY) layer 609 provides a physical connection between the transceiver 611 and the PON transceiver 607. The physical (PHY) layer 609 and the PON transceiver bidirectionally communicate with each other. A limiting amplifier and laser diode driver circuit 608 disposed between the physical (PHY) layer 609 and the PON transceiver 605 provide limiting amplification in the downlink direction and laser diode driver functionality in the uplink direction. The PON transceiver 607 is adapted to receive the at least one optical fiber 607.

The first component box further comprises a power source 603 which may be a DC/DC isolated power source. The power source may also be powered by an AC-to-DC converter.

The second component box 631 further comprises a PON transceiver 605 connected thereto. A physical (PHY) layer 651 provides a physical connection between the transceiver 645 and the PON transceiver 655. The physical (PHY) layer 651 and the PON transceiver 655 bidirectionally communicate with each other. A limiting amplifier and laser diode driver circuit 653 disposed between the physical (PHY) layer 651 and the PON transceiver 655 provide limiting amplification in the uplink direction and laser diode driver functionality in the downlink direction. The PON transceiver 655 is adapted to accommodate different user Residential gateways with interfaces such as POTS 261, 100BaseT 263, 1000BaseT 269, IP-Video 265, PABX 267, and so on are as previously described in FIG. 2.

The second component box further comprises a power source 633 which may be a DC/DC isolated power source. The power source may also be powered by an AC-to-DC converter.

Advantageously, the first and second associated transceiver pairs of this disclosure allow PON data to be bi-directionally transmitted wirelessly across partition 630. This avoids the need for the optical fiber 607 to have to pass through the partition at great time and expense to the provider to implement.

Figure 7:
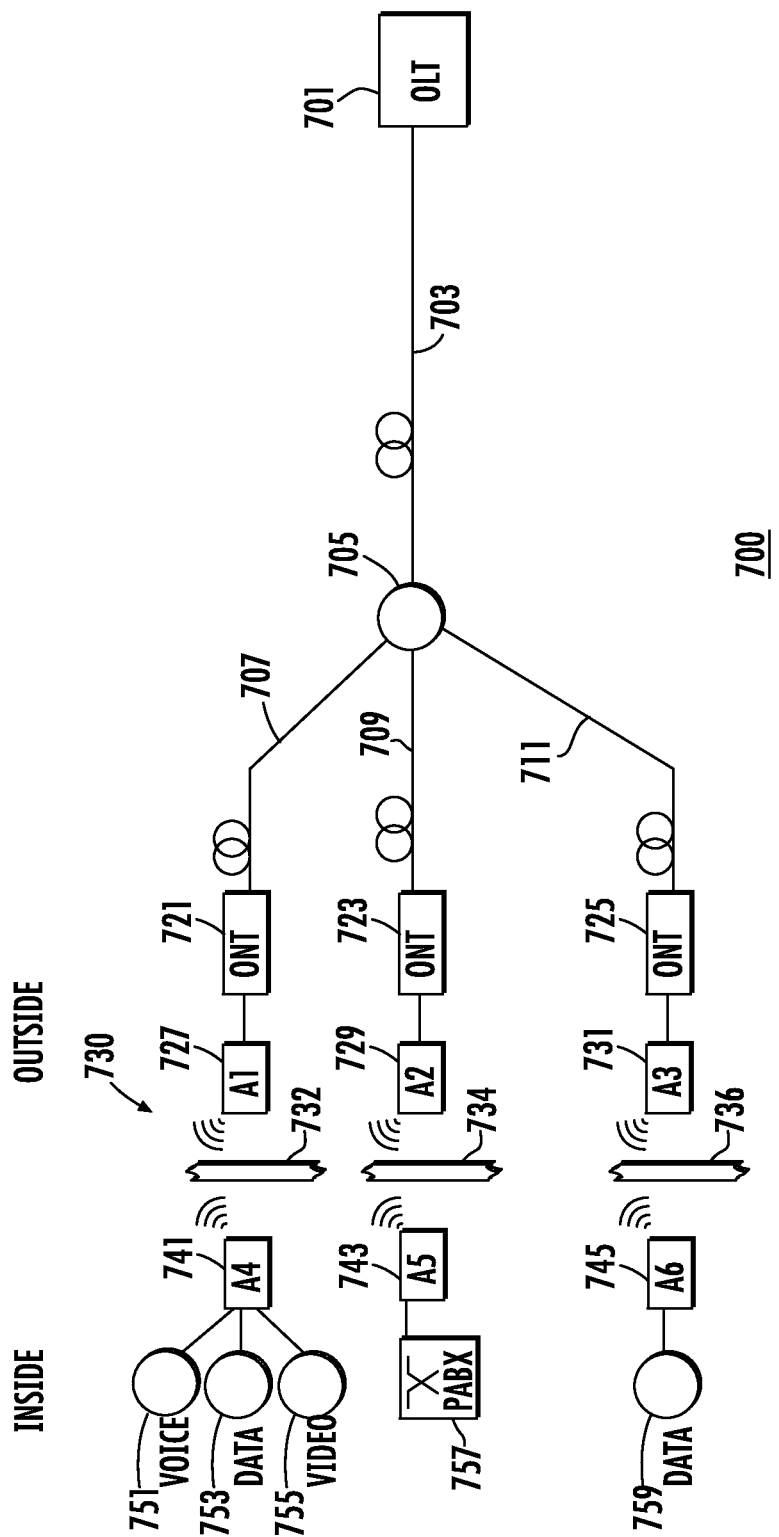
FIG. 7 is an embodiment of an illustrative third system architecture of this disclosure.

FIG. 7 is an embodiment of an illustrative third system architecture of this disclosure. The passive optical network (PON) system 700 includes an optical line termination (OLT) 701 of a PON outside a building, an optical network terminal (ONT) 721, 723, 725 of a PON outside the building, the ONT communicatively coupled to the OLT and at least one first transceiver 727, 729, 731 outside the building communicatively coupled to the ONT 721, 723, 725 and configured for wirelessly transmitting to and receiving data from the PON. The passive optical network system also includes at least one second transceiver 741, 743, 745 inside the building configured to wirelessly transmit to and receive data from the at least one first transceiver 727, 729, 731, and also includes a module for implementing a user interface, a module for implementing a radio frequency (RF) to Ethernet conversion and a module for implementing a gateway interface. The user interface module, the RF to Ethernet conversion module and the gateway interface module are communicatively coupled to the at least one second transceiver 741, 743, 745 and configured for transmitting to and receiving data from the PON.

The optical line termination (OLT) 701 provides network access via the optical fiber 703 to a splitter/combiner 705, similar to the splitter/combiner previously discussed. On the downlink path, the splitter/combiner 705 splits the signals on optical fiber 703 into three signals, one applied to each separate optical fiber 707, 709, 711. On the uplink path, the splitter/combiner combines the signals on optical fibers 707, 709, into a single channel on optical fiber 703 for transmission to the optical line termination (OLT) 701.

Figure 8:
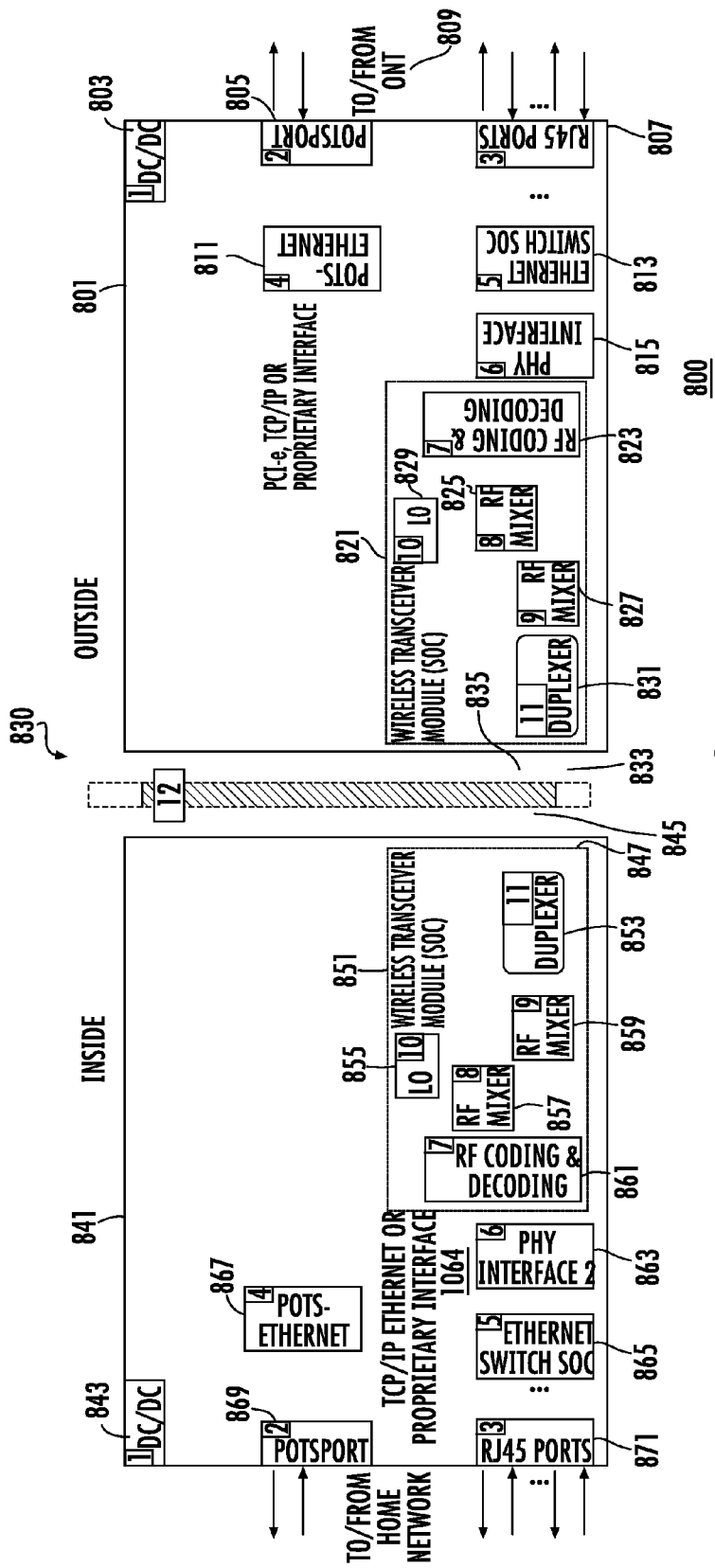
FIG. 8 is a first implementation of the embodiment of FIG. 7.

FIG. 8 is a first implementation of the embodiment of FIG. 7. A first component box 801 is located outside a building. The component box 801 includes at least one first transceiver 821 outside the building that is communicatively coupled to a terminal end of the at least one optical fiber 807. The at least one first transceiver 821 is configured for wirelessly transmitting to and receiving data from the PON. Wireless transmission occurs via path 833 and antenna 835.

Inside the building is a second component box 841. The second component box 841 includes at least one second transceiver 851 which is located inside the building. Second transceiver 851 is configured to wirelessly transmit to and receive data from the at least one first transceiver 821, with which it is associated. Wireless transmission occurs via path 847 and antenna 845.

Each of the first transceiver 821 and the second transceiver 851 comprises an RF codex 823, 861, respectively, which transforms an optical signal into a radio frequency signal and vice versa. Each transceiver further comprises a local oscillator 829, 855, respectively, which generates a carrier frequency; an RF mixer 821, 857, respectively which is a circuit that mixes the frequency of the data with the carrier frequency; and a duplexer 831, 853, respectively which is a circuit that provides for bidirectional communication over the same communication link.

Each of the first component box 801 and the second component box 841 further comprises a power source 803, 843, respectively, which may be a DC/DC isolated power source. The power source may also be powered by an AC-to-DC converter.

Each of the first component box 801 and the second component box 841 further comprises a POTs port 805, 869 respectively, for receiving and transmitting voice signals. Each of the first component box 801 and the second component box 841 further comprises a POTS to Ethernet converter 811, 867, respectively, for converting voice signals into an Ethernet format.

Each of the first component box 801 and the second component box 841 further comprises a transceiver RJ45 Port 807, 871 connected thereto. A physical (PHY) layer 815, 863, respectively, provides a physical connection between the transceiver 821, 851, respectively, and an Ethernet Switch System on Chip (Ethernet Switch SoC) 813, 865, respectively.

Advantageously, the Ethernet Switch SoC 813, 865 of each of the first component box 801 and the second component box 841, respectively, is in bidirectional communication with both RJ45 ports 807, 871 and the POTS Ethernet converter 811, 867. Hence, the Ethernet Switch SoC 813, 865, respectively, in this example transforms to Ethernet format signals that originate as either data signals, voice signals or both. The RJ45 port 807 of the first component box 801 is adapted to receive the at least one optical fiber 607. The RJ45 port 871 of the second component box 841 is adapted to accommodate different user Residential gateways with interfaces such as POTS 261, 100BaseT 263, 1000BaseT 269, IP-Video 265, PABX 267, and so on are as previously described in FIG. 2. The POTS ports 805, 869 are adapted to receive and transmit voice signals.

Advantageously, the first and second associated transceiver pairs of this disclosure allow PON data to be bidirectionally transmitted wirelessly across partition 830. This avoids the need for the optical fiber 807 to have to pass through the partition at great time and expense to the provider to implement.

Figure 9:
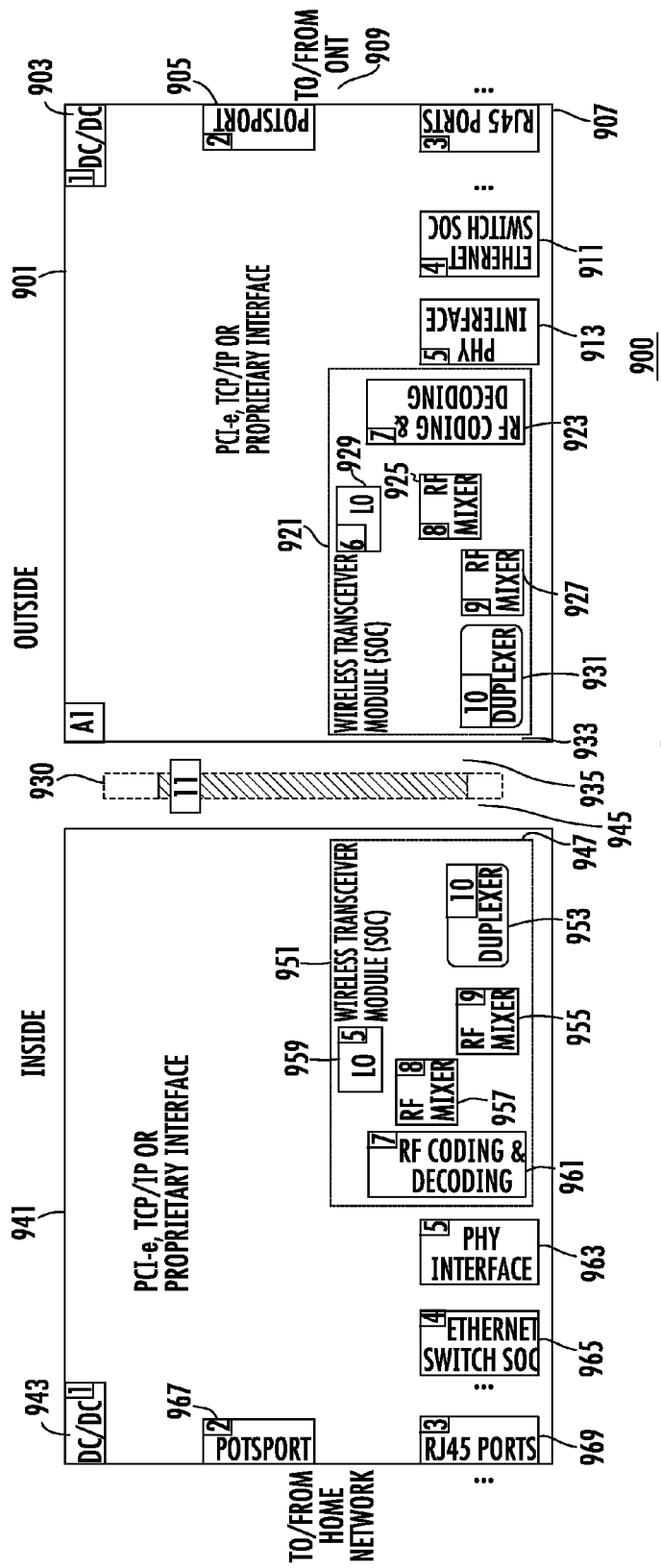
FIG. 9 is a second implementation of the embodiment of FIG. 7.

FIG. 9 is a second implementation of the embodiment of FIG. 7. A first component box 901 is located outside a building. The component box 901 includes at least one first transceiver 921 outside the building that is communicatively coupled to a terminal end of the at least one optical fiber 907. The at least one first transceiver 921 is configured for wirelessly transmitting to and receiving data from the PON. Wireless transmission occurs via path 933 and antenna 935.

Inside the building is a second component box 941. The second component box 941 includes at least one second transceiver 951 which is located inside the building. Second transceiver 951 is configured to wirelessly transmit to and receive data from the at least one first transceiver 921, with which it is associated. Wireless transmission occurs via path 947 and antenna 945.

Each of the first transceiver 921 and the second transceiver 951 comprises an RF codex 923, 961, respectively, which transforms an optical signal into a radio frequency signal and vice versa. Each transceiver further comprises a local oscillator 929, 959, respectively, which generates a carrier frequency; an RF mixer 927, 957, respectively which is a circuit that mixes the frequency of the data with the carrier frequency; and a duplexer 931, 953, respectively which is a circuit that provides for bidirectional communication over the same communication link.

Each of the first component box 901 and the second component box 941 further comprises a power source 903, 943, respectively, which may be a DC/DC isolated power source. The power source may also be powered by an AC-to-DC converter.

Each of the first component box 901 and the second component box 941 further comprises a POTs port 905, 967 respectively, for receiving and transmitting voice signals.

Each of the first component box 901 and the second component box 941 further comprises a transceiver RJ45 port 907. A physical (PHY) layer 913, 963 provides a physical connection between the transceiver 921, 951, respectively, and an Ethernet Switch System on Chip (Ethernet Switch SoC) 911, 965, respectively.

The Ethernet Switch SoC 911, 965 is in bidirectional communication with RJ45 ports 907, 969 to transform into Ethernet format signals that originate as data signals. Advantageously, the physical (PHY) layer 913, 963 receives the Ethernet format signals from the Ethernet Switch SoC 911, 965, respectively, and also receives voice signals from the POTS port 905, 967, respectively. Hence, the voice signals from the POTS port are transformed into Ethernet format signals in the physical (PHY) layer 913, 963, respectively, in this example. The RJ45 port 907 is adapted to receive the at least one optical fiber 907. The RJ45 port 969 is adapted to accommodate different user Residential gateways with interfaces such as POTS 261, 100BaseT 263, 1000BaseT 269, IP-Video 265, PABX 267, and so on are as previously described in FIG. 2. The POTS ports 905, 967 are adapted to receive and transmit voice signals.

Advantageously, the first and second associated transceiver pairs of this disclosure allow PON data to be bi-directionally transmitted wirelessly across partition 930. This avoids the need for the optical fiber 907 to have to pass through the partition at great time and expense to the provider to implement.

Figure 10:
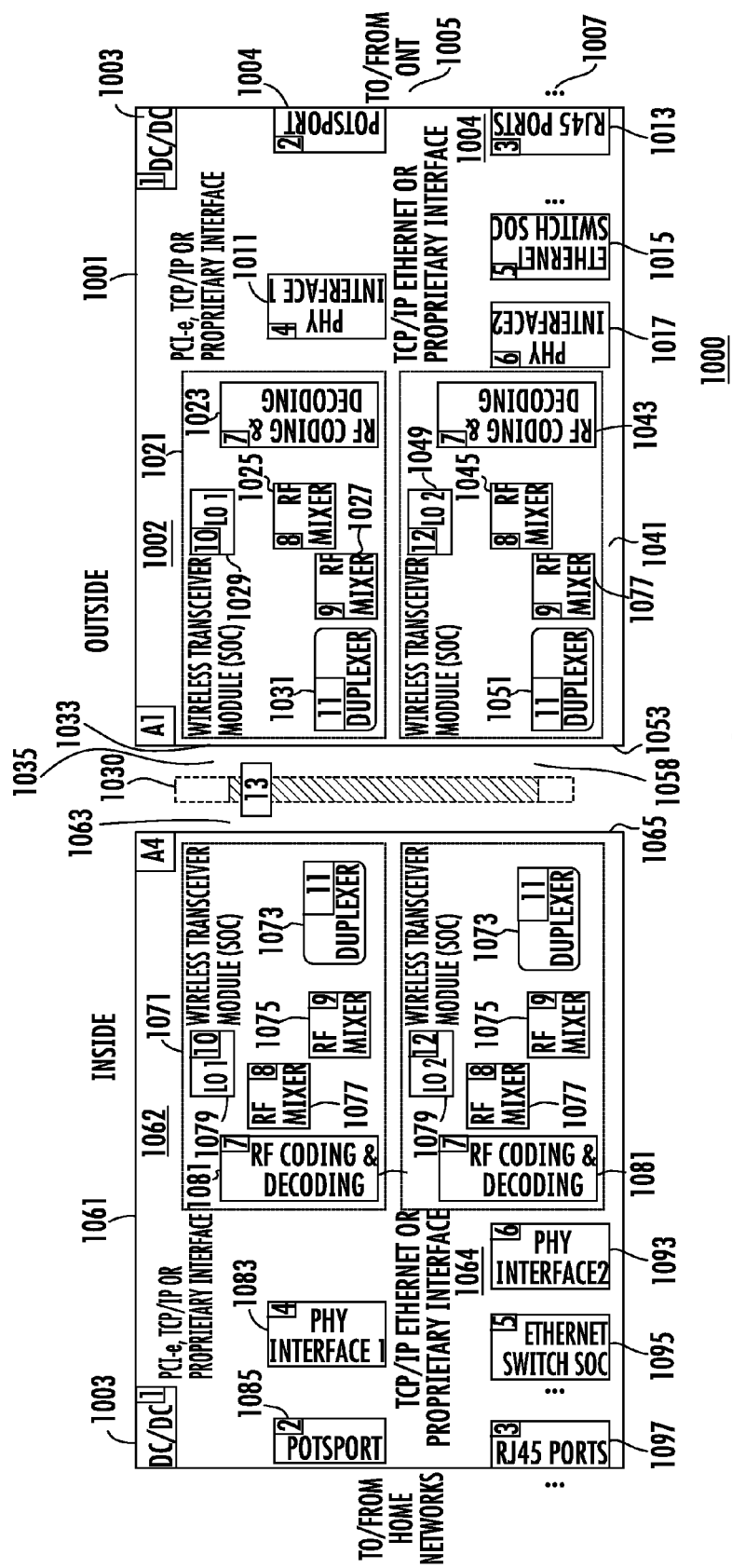
FIG. 10 is a third implementation of the embodiment of FIG. 7.

FIG. 10 is a third implementation of the embodiment of FIG. 7. A first component box 1001 is located outside a building. The component box 1001 includes at least one first transceiver 1041 outside the building that is communicatively coupled to a terminal end of the at least one optical fiber 1007. The at least one first transceiver 1041 is configured for wirelessly transmitting to and receiving data from the PON. Wireless transmission occurs via path 1053 and antenna 1055.

Inside the building is a second component box 1061. The second component box 1061 includes at least one second transceiver 1091 which is located inside the building. Second transceiver 1091 is configured to wirelessly transmit to and receive data from the at least one first transceiver 1041, with which it is associated. Wireless transmission occurs via antenna 1065.

Each of the first transceiver 1041 and the second transceiver 1091 comprises an RF codex 1043, 1081, respectively, which transforms an optical signal into a radio frequency signal and vice versa. Each transceiver further comprises a local oscillator 1049, 1079, respectively, which generates a carrier frequency; an RF mixer 1045, 1077, respectively which is a circuit that mixes the frequency of the data with the carrier frequency; and a duplexer 1051, 1073, respectively which is a circuit that provides for bidirectional communication over the same communication link.

Each of the first transceiver 1041 and the second transceiver 1091 is further provided with a mirror transceiver depicted as transceivers 1021, 1071, respectively, with antenna 1035, 1063. These first and second mirror transceivers, respectively have like components, functionality, and operation as counterpart transceivers 1041, 1091, respectively.

Each of the first component box 1001 and the second component box 1061 further comprises a power source 1003, 1063 which may be a DC/DC isolated power source. The power source may also be powered by an AC-to-DC converter.

Each of the first component box 1001 and the second component box 1061 further comprises a POTs port 1009, 1085, respectively, for receiving and transmitting voice signals.

Each of the first component box 1001 and the second component box 1061 further comprises transceiver RJ45 ports 1013, 1097. A first physical (PHY) interface 1017, 1093, provides a physical connection between the transceiver 1041, 1091, respectively, and an Ethernet Switch System on Chip (Ethernet Switch SoC) 1015, 1095, respectively.

The Ethernet Switch SoC 1015, 1095 is in bidirectional communication with RJ45 ports 1013, 1097, to transform into Ethernet format signals that originate as data signals. Hence, the data signals from the RJ45 ports 1013, 1097 are transformed into Ethernet format signals by the Ethernet SoC 1015, 1095, respectively, in this example, which applies the Ethernet format signals to transceivers 1041, and 1091, respectively.

A second physical (PHY) interface 1011, 1083 receives the voice signals from the POTS ports 1009, 1085, respectively. Advantageously, the second physical (PHY) interface 1011, 1083 transforms the voice signals into Ethernet format and applies the Ethernet format signals to mirror transceivers 1021, 1071, respectively.

The RJ45 port 1007 is adapted to receive the at least one optical fiber 1007. The RJ45 port 1097 is adapted to accommodate different user Residential gateways with interfaces such as POTS 261, 100BaseT 263, 1000BaseT 269, IP-Video 265, PABX 267, and so on are as previously described in FIG. 2. The POTS ports 1004, 1085 are adapted to receive and transmit voice signals.

Advantageously, the first and second associated transceiver pairs and associated mirror transceivers of this disclosure allow PON data to be bi-directionally transmitted wirelessly across partition 1030. This avoids the need for the optical fiber 1007 to have to pass through the partition at great time and expense to the provider to implement.

Figure 11:
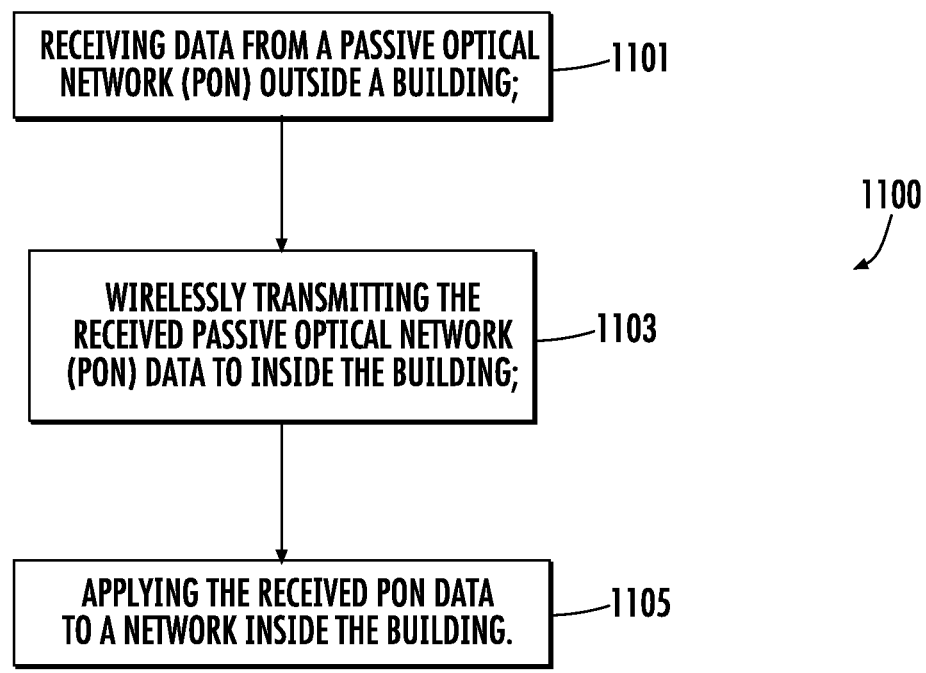
FIG. 11 is a flowchart for a method according to the present disclosure.

FIG. 11 is a flowchart 1100 for a method according to the present disclosure. The method includes receiving 1101 data from a passive optical network (PON) outside a building, wirelessly transmitting 1103 the received PON data to inside the building and applying 1105 the received PON data to a network inside the building. In one embodiment, the data received outside the building is from an optical line termination (OLT). In one embodiment, the PON data wireless transmitted inside the building is applied to an optical line terminal (ONT) inside the building. In still another embodiment, the method includes a step of applying the PON data to a user interface inside the building. In other embodiments, the method includes a step of applying the PON data to a gateway interface inside the building.

In another embodiment, the method includes converting the wirelessly received PON data inside the building to Ethernet format. In another method, there is a step of receiving the PON data from an FTTX deployment of the PON. In this embodiment, the FTTX deployment is selected from the group consisting of fiber-to-the-home (FTTH), fiber-to-the-business or building (FTTB), fiber to the node (FTTN), fiber to the curb or cabinet (FTTC), and fiber-to-the-premises (FTTP). In still another embodiment, the method includes steps of mounting the first transceiver on a surface outside the building selected from the group consisting of a corridor, a window, a door, a wall and a façade and mounting the second transceiver on a surface inside the building selected from the group consisting of a corridor, a window, a door, a wall and a façade.

There is thus disclosed systems and methods that provide for more convenient and lower cost installation and deployment of a fiber optic communications system. The systems and method disclosed herein enjoy many advantages over the prior art. No through penetration of a wall or other physical access inside a customer's building or premises is required. This avoids the necessity of authorization or approval for a penetration from a homeowner, landlord, owner association, security committee, committee of public safety, or other authority. An installer or owner can securely place the devices on a wall or a window of a building without a costly authorization or installation process. Since no physical access or modification is needed, the subscribers, users or customers will not be inconvenienced by waiting for an installation crew. There will also be no noise, dust or other hazard associated with the installation. The systems and methods disclosed herein work transparently to the user and to the communications network. Two-way communications are also enabled in the systems and methods according to the present disclosure.

Depending on the embodiment and implementation used, the wireless bridge across the barrier may be completely transparent to the user and to the network provider. The wireless connection functions as a seamless bridge within the links of the fiber-optic based passive optical network. The solution works well in all traditional FTTX deployments scenarios that use traditional optical network terminals and optical line terminations or both. Depending on the embodiment and implementation used, a PON protocol and SoC for PON networks may be avoided. Thus, only standard interfaces, such as for POTS, Ethernet, and the like, may be required for quick installation and robust service. Accordingly, relatively small and light-weight devices may be suitable for the outside terminal and the mating inside terminal. Correspondingly low power consumption may also be possible, making the use of batteries possible rather than requiring power supplies for each terminal. As noted above, the communications services available may include broadband, and thus broadband capabilities of both fiber-optic and 5 GHz or millimeter-wave wireless technology may be used herein.

One embodiment of the disclosure relates to a passive optical network system. This embodiment may be considered a first system architecture. The system includes at least one optical fiber coupled to an optical line termination (OLT) of a PON. At least one first transceiver outside a building is communicatively coupled to a terminal end of the at least one optical fiber. The at least one first transceiver is configured for wirelessly transmitting to and receiving data from the PON. At least one second transceiver inside the building is configured to wirelessly transmit to and receive data from the at least one first transceiver. The system also includes a module for implementing a user interface, a module for implementing a radio frequency (RF) to Ethernet conversion and a module for implementing a gateway interface. The user interface module, the RF to Ethernet conversion module, and the gateway interface module are communicatively coupled to the at least one second transceiver and configured for transmitting to and receiving data from the PON.

In other embodiments, the system further includes an optical combiner/splitter, wherein the coupling of the at least one optical fiber to the OLT is through the optical splitter. In another embodiment, the module for implementing a user interface is selected from the group of a wireless interface, a CAT5 interface, an optical fiber interface, and coax cable interface. In another embodiment, the module for implementing a gateway interface is selected from the group of POTS interface, 100BaseT interface, 1000BaseT interface, IP-Video interface, and Cable-TV interface. In some embodiments, the first transceiver is mounted on a surface selected from the group consisting of a corridor, a window, a door, a wall, and a façade outside the building and the second transceiver is mounted on a surface selected from the group consisting of a corridor, a window, a door, a wall and a façade inside the building.

Some embodiments may be considered as a first implementation of the first System Architecture. In one of these embodiments, the system further includes a PHY/MAC interface between the at least one first transceiver and the optical line termination (OLT). In one such embodiment, the system further includes a PHY/MAC interface and a PON transceiver, the PHY/MAC interface being disposed between the at least one first transceiver and the PON transceiver. The PHY/MAC interface may include a GPON/EPON system on a chip (GPON/EPON SoC) and a physical (PHY) layer, the PON transceiver being adapted to receive the at least one optical fiber. The GPON/EPON SoC may include a Serial Gigabit Media Independent Interface (SGMII) interface.

In at least one such embodiment, the at least one optical fiber is an FTTX deployment of the PON, wherein the FTTX deployment is selected from the group consisting of fiber-to-the-home (FTTH), fiber-to-the-business or building (FTTB), fiber to the node (FTTN), fiber to the curb or cabinet (FTTC), and fiber-to-the-premises (FTTP). In another embodiment of the first implementation, the system further includes a memory accessible to the PON SoC, wherein the memory is selected from the group consisting of a volatile memory and a non-volatile memory. In another embodiment, the system further includes a power source. Some embodiments may be considered as a second implementation of the first System Architecture. In one such embodiment, the PON SoC may include an optical interface bidirectional optical subassembly interface (BOSA Interface) or a transceiver interface (TRX Interface) or other optical interface.

Another embodiment of the disclosure also relates to a passive optical network and may be considered as second system architecture. The passive optical network (PON) system includes an optical line termination (OLT) of a PON outside a building, an optical network terminal (ONT) of a PON inside the building and a transceiver bridge disposed between the OLT and the ONT. The transceiver bridge includes at least one first transceiver outside the building communicatively coupled to the OLT and configured for wirelessly transmitting and receiving data from the PON and at least one second transceiver communicatively coupled to the ONT and configured to wirelessly transmit and receive data from the at least one first transceiver.

There are additional embodiments of this second system architecture. In one embodiment, the system further includes an optical combiner/splitter, wherein the coupling of the at least one optical fiber to the OLT is through the optical combiner/splitter. In another embodiment, the module for implementing a user interface is selected from the group of CAT5 interface, optical fiber interface, and coax cable interface. In yet another embodiment, the module for implementing a gateway interface is selected from the group of POTS interface, 100BaseT interface, 1000BaseT interface, IP-Video interface, and Cable-TV interface. In at least one of these embodiments, each of the at least one first transceiver and the at least one second transceiver includes a radio frequency (RF) coding and decoding module, a first and a second RF mixer, a duplexer and a local oscillator.

In this embodiment, the system further includes a first PON transceiver and a first physical (PHY) interface and a second PON transceiver and a second physical (PHY) interface, the first PHY interface being disposed between the first PON transceiver and the at least one first transceiver and the second PHY interface being disposed between the second PON transceiver and the at least one second transceiver. In embodiments, this system further comprises a first limiting amplifier and laser diode driver disposed between the first PON transceiver and the first PHY interface and a second limiting amplifier and laser diode driver disposed between the second PON transceiver and the second PHY interface, each of the first limiting amplifier and laser diode driver and the second limiting amplifier and laser diode driver amplifying a first signal and a second signal from the first PON transceiver and the second PON transceiver, respectively, and modifying a third signal and a fourth signal from the first PHY interface and the second PHY interface, respectively, for application to the first PON transceiver and the second PON transceiver, respectively. In embodiments of this system, the first PON transceiver is adapted to receive an FTTX deployment of the PON from the OLT and the second PON transceiver is adapted to receive an FTTX deployment of the PON from the ONT. The FTTX deployment is selected from the group consisting of fiber-to-the-home (FTTH), fiber-to-the-business or building (FTTB), fiber to the node (FTTN), fiber to the curb or cabinet (FTTC), and fiber-to-the-premises (FTTP) systems.

Another embodiment of the disclosure also relates to a passive optical network and may be considered a third system architecture. The passive optical network (PON) system includes an optical line termination (OLT) of a PON outside a building, an optical network terminal (ONT) of a PON outside the building, the ONT communicatively coupled to the OLT and at least one first transceiver outside the building communicatively coupled to the ONT and configured for wirelessly transmitting to and receiving data from the PON. The passive optical network system also includes at least one second transceiver inside the building configured to wirelessly transmit to and receive data from the at least one first transceiver, and also includes a module for implementing a user interface, a module for implementing a radio frequency (RF) to Ethernet conversion and a module for implementing a gateway interface. The user interface module, the RF to Ethernet conversion module and the gateway interface module are communicatively coupled to the at least one second transceiver and configured for transmitting to and receiving data from the PON.

In embodiments of this third system architecture, the system further includes an optical combiner/splitter, wherein the coupling of the at least one optical fiber to the OLT is through the optical combiner/splitter. In embodiments, the module for implementing a user interface is selected from the group consisting of a CAT5 interface, an optical fiber interface and a coax cable interface. In embodiments, the module for implementing a gateway interface is selected from the group of POTS interface, 100BaseT interface, 1000BaseT interface, IP-Video interface and Cable-TV interface. In some embodiments, each of the at least one first transceiver and the at least one second transceiver comprises: a radio frequency (RF) coding and decoding module, a first and a second RF mixer, a duplexer and a low frequency signal generator. In embodiments, the system further includes a first access port and a first physical (PHY) layer and a second access port and a second physical (PHY) layer, the first PHY layer being disposed between the first access port and the at least one first transceiver and the second PHY layer being disposed between the second access port and the at least one second transceiver. In some embodiments, each of the first access port and the second access port is an RJ45 port. In some embodiments, the system further includes a third access port co-located with the first access port and a fourth access port co-located with the second access port, wherein each of the third access port and the fourth access port is a plain old telephone system (POTS) port.

Additional embodiments may be considered as a first implementation of the third architecture. In some embodiments, the system further includes a first Ethernet converter co-located with the third access port and a second Ethernet converter co-located with the fourth access port, the first Ethernet converters being configured for converting a non-Ethernet signal to Ethernet format and the second Ethernet converter being configured for converting an Ethernet signal to non-Ethernet format. In this implementation, the system further includes a first Ethernet switch system on a chip (SoC) co-located with the first access port and a second Ethernet SoC co-located with the second access port, wherein the signal from the first Ethernet converter is applied to or received from the first SoC and the signal from the second Ethernet converter is applied to or received from the second SoC.

An additional embodiment may be considered as a second implementation of the third architecture. In some embodiments, the first and second PHY layers are configured to process both Ethernet and non-Ethernet signals and the system further includes a first Ethernet switch system on a chip (SoC) co-located with the first access port and a second Ethernet SoC co-located with the second access port, wherein the signals from the third and the fourth access ports are applied to or received from the first and second PHY interface, respectively, and the signals from the first and second access port are applied to or received from the first and second PHY interface, respectively, through the first and the second Ethernet SoC.

Additional embodiments may be considered third implementations of the third architecture. In one of these embodiments, the system further includes at least one third transceiver outside the building communicatively coupled to the ONT and configured to wirelessly transmit to and receive data from the PON and at least one fourth transceiver inside the building configured to wirelessly transmit to and receive data from the at least one third transceiver and also includes a third and fourth PHY layer, the third PHY layer disposed between the third access port and the at least one third transceiver and the fourth PHY layer being disposed between the fourth access port and the at least one fourth transceiver, the first and second PHY layers configured to process Ethernet signals and the third and fourth PHY layers configured to process non-Ethernet signals. In one such embodiment, the system further includes a first Ethernet switch system on a chip (SoC) co-located with the first access port and a second Ethernet SoC co-located with the second access port, wherein the signals from the first and second access ports are applied to or received from the first and second PHY interfaces, respectively, through the first and the second Ethernet SoCs.

An additional embodiment of the disclosure relates to a method. The method includes receiving data from a passive optical network (PON) outside a building, wirelessly transmitting the received PON data to inside the building and applying the received PON data to a network inside the building. In one embodiment, the data received outside the building is from an optical line termination (OLT). In one embodiment, the PON data wireless transmitted inside the building is applied to an optical line terminal (ONT) inside the building.

In still another embodiment, the method includes a step of applying the PON data to a user interface inside the building. In other embodiments, the method includes a step of applying the PON data to a gateway interface inside the building. In another embodiment, the method includes converting the wirelessly received PON data inside the building to Ethernet format. In another method, there is a step of receiving the PON data from an FTTX deployment of the PON. In this embodiment, the FTTX deployment is selected from the group consisting of fiber-to-the-home (FTTH), fiber-to-the-business or building (FTTB), fiber to the node (FTTN), fiber to the curb or cabinet (FTTC), and fiber-to-the-premises (FTTP). In still another embodiment, the method includes steps of mounting the first transceiver on a surface outside the building selected from the group consisting of a corridor, a window, a door, a walls and a façade and mounting the second transceiver on a surface inside the building selected from the group consisting of a corridor, a window, a door, a wall and a façade.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A passive optical network (PON) system comprising:
an optical line termination (OLT) of a PON outside a building;
an optical network terminal (ONT) of a PON inside the building; and
a transceiver bridge disposed between the OLT and the ONT, the transceiver bridge comprising:
at least one first transceiver outside the building communicatively coupled to the OLT and configured for wirelessly transmitting and receiving data from the PON;
at least one second transceiver communicatively coupled to the ONT and configured to wirelessly transmit and receive data from the at least one first transceiver, wherein each of the at least one first transceiver and the at least one second transceiver comprises a radio frequency (RF) coding and decoding module, a first and a second RF mixer, a duplexer and a local oscillator;
a first PON transceiver and a first physical (PHY) interface and a second PON transceiver and a second physical (PHY) interface, the first PHY interface being disposed between the first PON transceiver and the at least one first transceiver and the second PHY interface being disposed between the second PON transceiver and the at least one second transceiver; and
a first limiting amplifier and laser diode driver disposed between the first PON transceiver and the first PHY interface and a second limiting amplifier and laser diode driver disposed between the second PON transceiver and the second PHY interface, each of the first limiting amplifier and laser diode driver and the second limiting amplifier and laser diode driver amplifying a first signal and a second signal from the first PON transceiver and the second PON transceiver, respectively, and modifying a third signal and a fourth signal from the first PHY interface and the second PHY interface, respectively, for application to the first PON transceiver and the second PON transceiver, respectively.

2. A passive optical network (PON) system comprising:
an optical line termination (OLT) of a PON outside a building;
an optical network terminal (ONT) of a PON outside the building, the ONT communicatively coupled to the OLT;
at least one first transceiver outside the building communicatively coupled to the ONT and configured for wirelessly transmitting to and receiving data from the PON;
at least one second transceiver inside the building configured to wirelessly transmit to and receive data from the at least one first transceiver, wherein each of the at least one first transceiver and the at least one second transceiver comprises a radio frequency (RF) coding and decoding module, a first and a second RF mixer, a duplexer and a low frequency signal generator;
a first access port and a first physical (PHY) layer and a second access port and a second physical (PHY) layer, the first PHY layer being disposed between the first access port and the at least one first transceiver and the second PHY layer being disposed between the second access port and the at least one second transceiver, wherein each of the first access port and the second access port is an RJ45 port;
a third access port co-located with the first access port and a fourth access port co-located with the second access port, wherein each of the third access port and the fourth access port is a plain old telephone system (POTS) port;
a module for implementing a user interface;
a module for implementing a radio frequency (RF) to Ethernet conversion; and
a module for implementing a gateway interface,
wherein the user interface module, the RF to Ethernet conversion module and the gateway interface module are communicatively coupled to the at least one second transceiver and configured for transmitting to and receiving data from the PON.

3. The system of claim 2 further comprising a first Ethernet converter co-located with the third access port and a second Ethernet converter co-located with the fourth access port, the first Ethernet converter being configured for converting a non-Ethernet signal to Ethernet format and the second Ethernet converter being configured for converting an Ethernet signal to non-Ethernet format.

4. The system of claim 3 further comprising a first Ethernet switch system on a chip (SoC) co-located with the first access port and a second Ethernet SoC co-located with the second access port, wherein the signal from the first Ethernet converter is applied to or received from the first SoC and the signal from the second Ethernet converter is applied to or received from the second SoC.

5. The system of claim 2 wherein the first and second PHY layers are configured to process both Ethernet and non-Ethernet signals and the system further comprising a first Ethernet switch system on a chip (SoC) co-located with the first access port and a second Ethernet SoC co-located with the second access port, wherein the signals from the third and the fourth access ports are applied to or received from the first and second PHY interface, respectively, and the signals from the first and second access port are applied to or received from the first and second PHY interface, respectively, through the first and the second Ethernet SoC.

6. The system of claim 2 further comprising
at least one third transceiver outside the building communicatively coupled to the ONT and configured to wirelessly transmit and receive data from the PON and at least one fourth transceiver inside the building configured to wirelessly transmit to and receive data from the at least one third transceiver; and a third and fourth PHY layer, the third PHY layer disposed between the third access port and the at least one third transceiver and the fourth PHY layer being disposed between the fourth access port and the at least one fourth transceiver, the first and second PHY layers configured to process Ethernet signals and the third and fourth PHY layers configured to process non-Ethernet signals.

7. The system of claim 6 further comprising a first Ethernet switch system on a chip (SoC) co-located with the first access port and a second Ethernet SoC co-located with the second access port, wherein the signals from the first and second access ports are applied to or received from the first and second PHY interfaces, respectively, through the first and the second Ethernet SoCs.

* * * * *